US011568626B2

(12) United States Patent
Wang et al.

(10) Patent No.: US 11,568,626 B2
(45) Date of Patent: *Jan. 31, 2023

(54) CARRIER-ASSISTED TRACKING

(71) Applicant: SZ DJI OSMO TECHNOLOGY CO., LTD., Shenzhen (CN)

(72) Inventors: Yan Wang, Shenzhen (CN); Bo Zang, Shenzhen (CN); Chenyu Xiang, Shenzhen (CN); Dicong Qiu, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,131

(22) Filed: Aug. 30, 2021

(65) Prior Publication Data

US 2021/0390327 A1      Dec. 16, 2021

Related U.S. Application Data

(63) Continuation of application No. 16/210,917, filed on Dec. 5, 2018, now Pat. No. 11,106,928, which is a (Continued)

(51) Int. Cl.
*G06K 9/00* (2022.01)
*G06V 10/25* (2022.01)
(Continued)

(52) U.S. Cl.
CPC ............. *G06V 10/25* (2022.01); *F16M 11/10* (2013.01); *F16M 11/18* (2013.01);
(Continued)

(58) Field of Classification Search
None
See application file for complete search history.

(56) References Cited

U.S. PATENT DOCUMENTS 5,734,933 A   3/1998  Sekine et al.
5,963,248 A   10/1999 Ohkawa et al.
(Continued)

FOREIGN PATENT DOCUMENTS

CN    103927745 A    7/2014
CN    103984193 A    8/2014
(Continued)

OTHER PUBLICATIONS

Hurak et al., "Image-Based Pointing and Tracking for Inertially Stabilized Airborne Camera Platform," in IEEE Transactions on Control Systems Technology, vol. 20, No. 5, pp. 1146-1159, Sep. 2012, doi: 10.1109/TCST.2011.2164541. (Year: 2012).*
(Continued)

*Primary Examiner* — Feng Niu
(74) *Attorney, Agent, or Firm* — Anova Law Group PLLC

(57) ABSTRACT

A method includes receiving selection of a target within an image captured by an image sensor of a payload and displayed on a user interface of the payload, detecting a deviation of the target from an expected target state within the image, generating, based at least partly on the deviation, a payload control signal including a first angular velocity for rotating the payload about an axis of the carrier to reduce the deviation about the axis in a subsequent image, and generating a base support control signal including a second angular velocity for rotating the payload with respect to the axis. When the first and second angular velocities are received, the carrier is controlled to rotate the payload at a third angular velocity about the axis. The third angular velocity is the first angular velocity, the second angular velocity, or a combination of both.

20 Claims, 14 Drawing Sheets

Related U.S. Application Data continuation of application No. PCT/CN2016/084955, filed on Jun. 6, 2016.

(51) Int. Cl.

| | | |
|---|---|---|
| H04N 5/232 | (2006.01) | |
| G01S 3/786 | (2006.01) | |
| F16M 11/10 | (2006.01) | |
| F16M 11/18 | (2006.01) | |
| G03B 17/56 | (2021.01) | |
| F16M 11/20 | (2006.01) | |
| F16M 13/04 | (2006.01) | |
| G06V 10/24 | (2022.01) | |
| G06V 30/142 | (2022.01) | |
| G06T 7/90 | (2017.01) | |

(52) U.S. Cl.
CPC ........ *F16M 11/2071* (2013.01); *F16M 13/04* (2013.01); *G01S 3/7865* (2013.01); *G03B 17/563* (2013.01); *G06T 7/90* (2017.01); *G06V 10/242* (2022.01); *G06V 30/142* (2022.01); *H04N 5/2328* (2013.01); *H04N 5/23206* (2013.01); *H04N 5/23216* (2013.01); *H04N 5/23218* (2018.08); *H04N 5/23254* (2013.01); *H04N 5/23299* (2018.08); *H04N 5/232127* (2018.08); *H04N 5/232933* (2018.08); *F16M 2200/041* (2013.01); *F16M 2200/044* (2013.01)

(56) References Cited

U.S. PATENT DOCUMENTS

| | | | |
|---|---|---|---|
| 6,226,388 B1 | 5/2001 | Qian et al. | |
| 6,249,589 B1 * | 6/2001 | Hoch | G06V 10/255 |
| | | | 382/103 |
| 7,038,709 B1 | 5/2006 | Verghese | |
| 7,046,823 B2 * | 5/2006 | Albus | G06T 7/20 |
| | | | 382/218 |
| 7,642,741 B2 * | 1/2010 | Sidman | G01C 21/18 |
| | | | 318/648 |
| 7,681,846 B1 * | 3/2010 | Mijailovic | F16M 11/2092 |
| | | | 248/122.1 |
| 7,742,077 B2 | 6/2010 | Sablak et al. | |
| 7,932,925 B2 * | 4/2011 | Inbar | G02B 27/646 |
| | | | 348/169 |
| 7,973,821 B2 | 7/2011 | Seo | |
| 8,098,893 B2 * | 1/2012 | Nakamura | G06T 7/246 |
| | | | 382/104 |
| 8,174,580 B2 | 5/2012 | Hayashi | |
| 8,174,581 B2 * | 5/2012 | Nakamura | G01S 3/7864 |
| | | | 348/169 |
| 8,179,078 B2 * | 5/2012 | Sidman | F16M 11/2014 |
| | | | 318/648 |
| 8,212,880 B2 * | 7/2012 | Anderson | H04N 5/2252 |
| | | | 348/208.7 |
| 8,305,450 B2 | 11/2012 | Nakamura | |
| 8,542,265 B1 | 9/2013 | Dodd et al. | |
| 8,896,697 B2 | 11/2014 | Golan et al. | |
| 8,903,568 B1 * | 12/2014 | Wang | B64C 39/024 |
| | | | 701/2 |
| 9,213,220 B2 | 12/2015 | Fowler et al. | |
| 9,219,870 B2 | 12/2015 | Mills et al. | |
| 9,243,741 B1 | 1/2016 | Chu et al. | |
| 9,491,359 B2 | 11/2016 | Hayashi | |
| 9,554,030 B2 * | 1/2017 | Li | H04N 5/232127 |
| 9,628,717 B2 | 4/2017 | Tsubusaki | |
| 9,681,065 B2 * | 6/2017 | Evans | H04N 5/33 |
| 9,740,922 B2 * | 8/2017 | Csaszar | G06F 3/014 |
| 9,781,599 B2 | 10/2017 | Myers et al. | |
| 9,883,092 B2 * | 1/2018 | Gottschlag | H04N 7/183 |
| 10,068,311 B2 | 9/2018 | Berghoff | |
| 10,075,653 B2 | 9/2018 | Jeong et al. | |
| 10,091,432 B2 * | 10/2018 | Mukunashi | H04N 5/23258 |
| 10,165,191 B2 | 12/2018 | Shimosato | |
| 10,257,402 B2 | 4/2019 | Kitagawa | |
| 10,270,973 B2 * | 4/2019 | Wakamatsu | H04N 5/23254 |
| 10,341,539 B2 * | 7/2019 | Chung | H04N 5/2254 |
| 10,349,279 B2 | 7/2019 | Myers et al. | |
| 2004/0022413 A1 | 2/2004 | Albus et al. | |
| 2005/0036036 A1 | 2/2005 | Stevenson et al. | |
| 2007/0050139 A1 * | 3/2007 | Sidman | F16M 11/18 |
| | | | 318/649 |
| 2008/0055413 A1 | 3/2008 | Hayashi | |
| 2008/0136923 A1 * | 6/2008 | Inbar | G02B 27/646 |
| | | | 348/E5.046 |
| 2008/0285848 A1 | 11/2008 | Meyer et al. | |
| 2009/0160951 A1 * | 6/2009 | Anderson | H04N 5/23258 |
| | | | 348/208.4 |
| 2009/0262197 A1 * | 10/2009 | Nakamura | G01S 3/7864 |
| | | | 348/169 |
| 2010/0079101 A1 * | 4/2010 | Sidman | F16M 11/041 |
| | | | 224/272 |
| 2010/0111489 A1 | 5/2010 | Presler | |
| 2010/0134632 A1 | 6/2010 | Won et al. | |
| 2010/0238296 A1 | 9/2010 | Nakamura | |
| 2010/0246886 A1 * | 9/2010 | Nakamura | G06T 7/246 |
| | | | 382/103 |
| 2011/0221900 A1 * | 9/2011 | Reich | G03B 15/006 |
| | | | 348/148 |
| 2011/0228098 A1 | 9/2011 | Lamb et al. | |
| 2011/0304736 A1 | 12/2011 | Evans et al. | |
| 2012/0019660 A1 | 1/2012 | Golan et al. | |
| 2012/0062691 A1 | 3/2012 | Fowler et al. | |
| 2012/0169842 A1 | 7/2012 | Chuang et al. | |
| 2012/0170804 A1 | 7/2012 | Lin et al. | |
| 2013/0326595 A1 | 12/2013 | Myers et al. | |
| 2014/0209777 A1 | 7/2014 | Klemin et al. | |
| 2014/0226858 A1 | 8/2014 | Kang et al. | |
| 2014/0267778 A1 | 9/2014 | Webb et al. | |
| 2015/0229827 A1 * | 8/2015 | Gottschlag | H04N 5/232939 |
| | | | 348/143 |
| 2015/0241713 A1 | 8/2015 | Laroia et al. | |
| 2015/0261070 A1 | 9/2015 | Feng et al. | |
| 2015/0309394 A1 | 10/2015 | Janze et al. | |
| 2015/0371082 A1 * | 12/2015 | Csaszar | G06F 3/017 |
| | | | 382/103 |
| 2016/0021315 A1 | 1/2016 | Tsubusaki | |
| 2016/0031559 A1 | 2/2016 | Zang | |
| 2016/0054903 A1 | 2/2016 | Jeong et al. | |
| 2016/0094774 A1 | 3/2016 | Li et al. | |
| 2016/0261784 A1 | 9/2016 | Mukunashi | |
| 2016/0284314 A1 | 9/2016 | Darshan et al. | |
| 2016/0349040 A1 | 12/2016 | Min et al. | |
| 2016/0381271 A1 * | 12/2016 | Cheng | F16M 11/2071 |
| | | | 348/208.2 |
| 2017/0041514 A1 | 2/2017 | Chung et al. | |
| 2017/0061236 A1 | 3/2017 | Pope | |
| 2017/0064180 A1 | 3/2017 | Kitagawa | |
| 2017/0064232 A1 | 3/2017 | Lim et al. | |
| 2017/0104938 A1 | 4/2017 | Shimosato | |
| 2017/0155924 A1 | 6/2017 | Gokhale et al. | |
| 2017/0163894 A1 * | 6/2017 | Wakamatsu | H04N 5/23261 |
| 2017/0272722 A1 | 9/2017 | Salvi et al. | |
| 2019/0049823 A1 | 2/2019 | Zhang et al. | |
| 2019/0230297 A1 | 7/2019 | Knorr et al. | |

FOREIGN PATENT DOCUMENTS

| | | |
|---|---|---|
| CN | 204188937 U | 3/2015 |
| CN | 104508346 A | 4/2015 |
| CN | 104680558 A | 6/2015 |
| CN | 104767906 A | 7/2015 |
| CN | 104914649 A | 9/2015 |
| CN | 105090695 A | 11/2015 |
| CN | 105184220 A | 12/2015 |
| CN | 105405138 A | 3/2016 |
| CN | 105447811 A | 3/2016 |
| CN | 105485189 A | 4/2016 |
| CN | 105486288 A | 4/2016 |
| CN | 105513087 A | 4/2016 |

(56) References Cited

FOREIGN PATENT DOCUMENTS

| | | | |
|---|---|---|---|
| CN | 105518555 | A | 4/2016 |
| CN | 105592269 | A | 5/2016 |
| CN | 205226838 | U | 5/2016 |
| DE | 102004052642 | A1 | 5/2006 |
| KR | 20140095333 | A | 8/2014 |
| WO | 2015085499 | A1 | 6/2015 |
| WO | 2015101822 | A1 | 7/2015 |
| WO | 2015159565 | A1 | 10/2015 |
| WO | 2016015251 | A1 | 2/2016 |

OTHER PUBLICATIONS

The World Intellectual Property Organization (WIPO) International search Report and Wntten oplnlon for PCT/CN2016/084942 dated Feb. 23, 2017 8 pages.
The World Intellectual Property Organization (WIPO) International search Report and Wntten oplnlon for PCT/CN2016/084955 dated Feb. 20, 2017 6 pages.
English Machine Translalion of CN104914649A, Accessed on Nov. 18, 2019.
Hui Cheng, Ctuna Moblle Smartphone Seuet, Jun. 2013, pp. 40-41, Beijing University of Posls and Temecommunicalions Press, China.
Michel Hennemann, The Digital Photogmphy Handbook, Jan. 2015, pp. 193-195, ctuna Photogmphy Publishing House, China.

\* cited by examiner

CARRIER-ASSISTED TRACKING

CROSS-REFERENCE TO RELATED APPLICATIONS

This application is a continuation of application Ser. No. 16/210,917, filed on Dec. 5, 2018, which is a continuation of International Application No. PCT/CN2016/084955, filed on Jun. 6, 2016, the entire content of which is incorporated herein by reference.

BACKGROUND OF THE DISCLOSURE

Modern mobile devices, such as smartphones and tablets, are often equipped with cameras and used to take pictures or videos of objects in the surrounding environment. A challenge arises, however, when movements of the objects require an operator of the mobile device move the mobile device accordingly so as to keep the objects in view. Even more skills may be required on the operator's part to maintain fast moving objects at specific image locations.

SUMMARY OF THE DISCLOSURE

According to embodiments, a method for tracking is provided. The method comprises detecting, by one or more processors of a payload, a deviation of a target from an expected target position within an image captured by an image sensor of the payload, the payload being releasably coupled to a carrier; and generating, by the one or more processors, one or more control signals for the carrier based at least in part on the detected deviation of the target, the one or more signals causing the carrier to change a pose of the payload so as to reduce the detected deviation in a subsequent image captured by the image sensor.

In some embodiments, the method can further comprise identifying, by the one or more processors of the payload, the target within the image based at least in part on the initial target information. The initial target information can be received from a user interface provided by the payload. Identifying the target can include determining a current position of the target within the image and the method can further comprise causing adjustment of a focal length of the image sensor based at least in part on the current position of the target.

In some embodiments, the deviation can be detected based at least in part on expected target information comprising an expected target position or an expected target size. The expected target information can be received from a user interface provided by the payload.

In some embodiments, the control signals can include an angular velocity with respect to a rotation axis of the carrier.

In some embodiments, the method can further comprise transmitting, by the payload, the one or more control signals to the carrier using a wireless connection. The wireless connection can be a Bluetooth, Wifi, or near field communication (NFC) connection.

Other embodiments are directed to systems, devices, and computer readable media associated with methods described herein. For instance, one or more non-transitory computer-readable storage media is provided. The computer-readable storage media stores computer-executable instructions that, when executed by a computing system of a payload, configure the computing system to perform operations comprising detecting a deviation of a target from an expected target position within an image captured by an image sensor of the payload, the payload being releasably coupled to a carrier; and generating, by the one or more processors, one or more control signals for the carrier based at least in part on the detected deviation of the target, the one or more signals causing the carrier to change a pose of the payload so as to reduce the detected deviation in a subsequent image captured by the image sensor.

In some embodiments, the operations can further comprise identifying the target within the image based at least in part on the initial target information. The initial target information can be received from a user interface provided by the payload. Identifying the target can include determining a current position of the target within the image and the operations can further comprise causing adjustment of a focal length of the image sensor based at least in part on the current position of the target.

In some embodiments, the deviation can be detected based at least in part on expected target information comprising an expected target position or an expected target size. The expected target information can be received from a user interface provided by the payload.

In some embodiments, the control signals can include an angular velocity with respect to a rotation axis of the carrier.

In some embodiments, the operations can further comprise transmitting the one or more control signals to the carrier using a wireless connection. The wireless connection can be a Bluetooth, Wifi, or near field communication (NFC) connection.

According to embodiments, a method for supporting tracking is provided. The method can comprise receiving, by a carrier, one or more payload control signals from a payload releasable coupled to the carrier, the payload control signals generated by the payload in response to detecting a deviation of a target from an expected target position within an image captured by the payload; and actuating, based at least in part on the one or more payload control signals, one or more actuators of the carrier to change a pose of the payload based at least in part on the payload control signals.

In some embodiments, the payload control signals can comprise an angular velocity with respect to a rotation axis of the carrier. The payload control signals can be received using a wireless connection. The wireless connection can be a Bluetooth, Wifi, or near field communication (NFC) connection.

In some embodiments, actuating the one or more actuators can comprise generating one or more carrier control signals based at least in part on the payload control signals and actuating the one or more actuators based at least in part on the carrier control signals. The carrier control signals can be generated based at least in part on a state of the one or more actuators.

Other embodiments are directed to systems, devices, and computer readable media associated with methods described herein. For instance, a carrier configured to support a payload can be provided. The carrier comprises one or more actuator configured to allow rotation of the payload relative to the carrier with respect to one or more axes; a communication unit configured to receive one or more payload control signals from the payload, the control signals generated by the payload in response to detecting a deviation of a target from an expected target position within an image captured by the payload; and a carrier controller communicative coupled to the communication unit and the one or more actuators, the carrier controller configured to control the actuators to change a pose of the payload based at least in part on the one or more payload control signals.

In some embodiments, the payload control signals can comprise an angular velocity with respect to one of the one or more axes. The communication unit can be configured to receive the one or more payload control signals using a wireless connection. The wireless connection can include a Bluetooth, Wifi, or near field communication (NFC) connection.

In some embodiments, the carrier controller can be further configured to generate carrier control signals for controlling the actuators based at least in part on the payload control signals. The payload can be releasably coupled to the carrier.

In some embodiments, the carrier controller can be further configured to control the actuators based at least in part on base control signals provided by a base support coupled to the carrier.

According to embodiments, a method for image processing is provided. The method can comprise obtaining, by a graphics processing unit (GPU) of a mobile device, a first set of image data having a first pixel size and a first color format, the first set of image data being generated by an image sensor of the mobile device; resampling, by the GPU, the first set of image data to generate a second set of image data having a second pixel size; and reformatting, by the GPU, the second set of image data to generate a third set of image data having a second color format, wherein the third set of image data is used for tracking an object by the mobile device.

In some embodiments, reformatting the second set of image data can comprise determining color information for each pixel of the third set of image data based on color information of the corresponding pixel of the second set of image data.

In some embodiments, the method can further comprise reformatting, by a vector processor of a central processing unit (CPU) of the mobile device, the third set of image data to generate a fourth set of image data having a third color format. Reformatting the third set of image data can comprise removing a color channel for each pixel of the third set of image data. The fourth set of image data can be processed, by the CPU, to identify the object.

In some embodiments, tracking of the object can be based at least in part on initial target information received from user interface provided by the mobile device.

In some embodiments, the third set of image data can be processed, by a central processing unit (CPU) of the mobile device, to generate control signals for controlling a carrier of the mobile device.

Other embodiments are directed to systems, devices, and computer readable media associated with methods described herein. For instance, one or more non-transitory computer-readable storage media can be provided. The computer-readable storage media can store computer-executable instructions that, when executed by a computing system of a mobile device, configure the computing system to perform operations comprising obtaining, by a graphics processing unit (GPU) of a mobile device, a first set of image data having a first pixel size and a first color format, the first set of image data being generated by an image sensor of the mobile device; resampling, by the GPU, the first set of image data to generate a second set of image data having a second pixel size; and reformatting, by the GPU, the second set of image data to generate a third set of image data having a second color format, wherein the third set of image data is used for tracking an object by the mobile device.

In some embodiments, reformatting the second set of image data can comprise determining color information for each pixel of the third set of image data based on color information of the corresponding pixel of the second set of image data.

In some embodiments, the operations further comprise reformatting, by a vector processor of a central processing unit (CPU) of the mobile device, the third set of image data to generate a fourth set of image data having a third color format. Reformatting the third set of image data can comprise removing a color channel for each pixel of the third set of image data. The fourth set of image data can be processed, by the CPU, to identify the object.

In some embodiments, tracking of the object can be based at least in part on initial target information received from user interface provided by the mobile device.

In some embodiments, the third set of image data can be processed, by a central processing unit (CPU) of the mobile device, to generate control signals for controlling a carrier of the mobile device.

A mobile device can be provided. The mobile device can comprise an image sensor configured to generate a first set of image data; a graphics processing unit (GPU) configured to resample the first set of image data to generate a second set of image data having a second pixel size; and reformat the second set of image data to generate a third set of image data having a second color format; and a central processing unit (CPU) configured to track an object using the third set of image data.

In some embodiments, reformatting the second set of image data can comprise determining color information for each pixel of the third set of image data based on color information of the corresponding pixel of the second set of image data.

In some embodiments, the CPU can comprise a vector processor configured to reformat the third set of image data to generate a fourth set of image data having a third color format. Reformatting the third set of image data can comprise removing a color channel for each pixel of the third set of image data.

In some embodiments, tracking the object comprises identifying the object can be based at least in part on initial target information received from user interface provided by the mobile device.

In some embodiments, tracking the object can comprise generating control signals for controlling a carrier of the mobile device.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Figure 1:
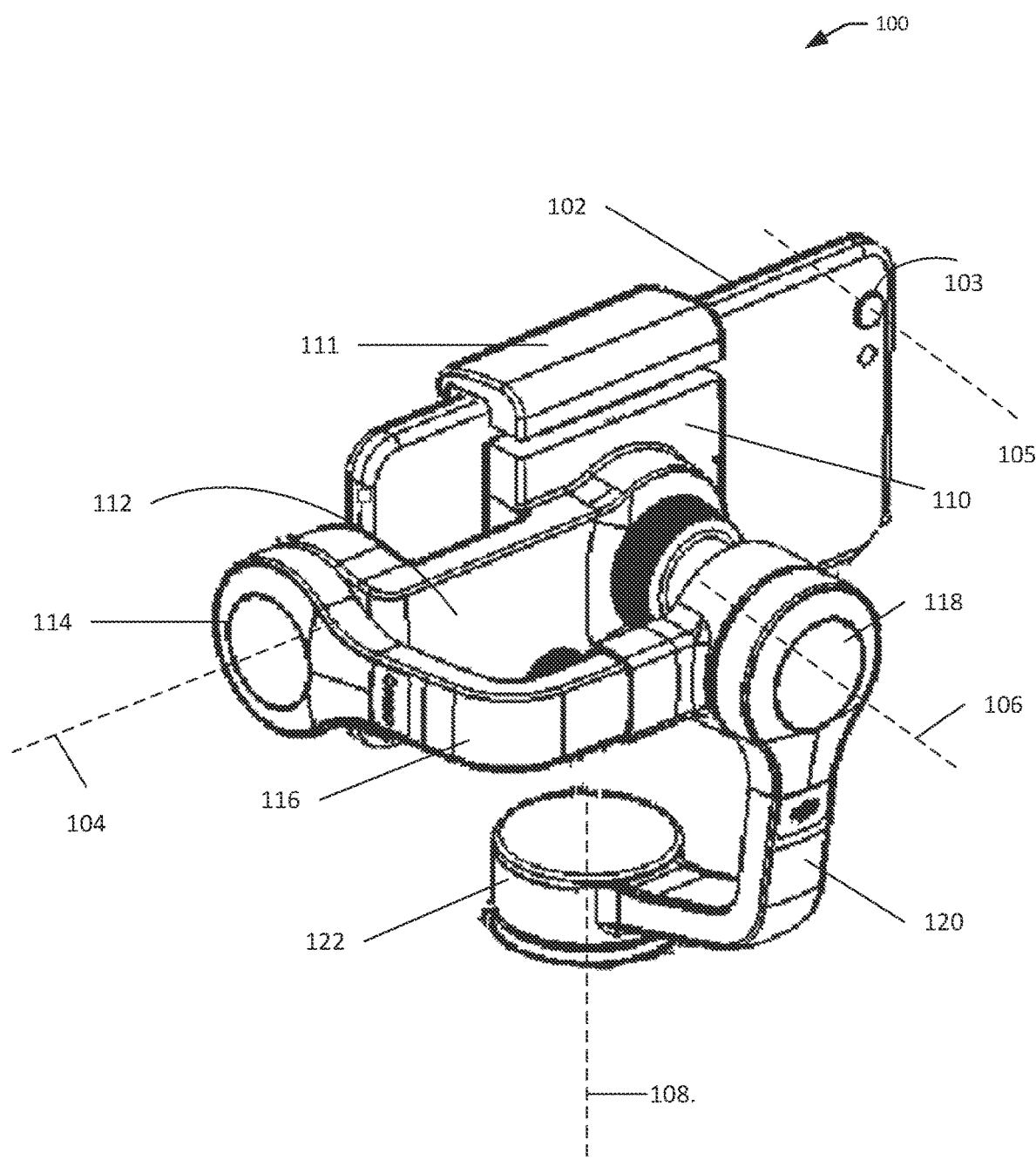
FIG. 1 illustrates a carrier, in accordance with embodiments.

The systems, devices, and methods of the present disclosure provide techniques for tracking objects using a payload (e.g., mobile device) without relying solely on the skills of operators. Specifically, assistance can be provided by a carrier that is coupled to the payload, which can be controlled to allow the payload to move relative to the carrier (e.g., up to three axes of freedom). The payload can be configured to identify a target to track from images captured by an image sensor of the payload. In some embodiments, the identification of the target by the payload can be based on initial target information (e.g., initial position and/or size) provided via a user interface provided by the payload or from other sources. The payload may be configured to display the images on a display where the tracked target is highlighted or otherwise indicated (e.g., by a bounded box around the target). When the target deviates from an expected position in the image, the payload can generate control signals for the carrier to compensate for the deviation. Based on the control signals, the carrier can change a pose of the payload (e.g., rotating the payload with respect to one or more axes), thereby changing the field of view of the image sensor of the payload so as to bring the perceived target closer to the expected position. In some embodiments, the payload may also be configured to adjust one or more parameters of the image sensor (e.g., focal length). For example, the target may be brought to focus given its current position by adjusting the focal length of the image sensor. As another example, the target may be maintained at an expected perceived size by zooming in or out. Advantageously, the described system, methods, and apparatus provide simple yet effective tracking of targets by payloads (e.g., smartphones). By directly controlling a carrier of the payload to adjust the pose of the payload, the payload can achieve faster and more precise pose change that provided by a human user, resulting in more effective tracking.

According to another aspect of the present disclosure, techniques are provided for efficient image processing. The tracking techniques described herein may require the input image data to have a pixel size and/or a color format that are different than those for the raw image data generated by the image sensor. Thus, the raw image data be pre-processed to have the correct size and/or format before being used for further processing (e.g., to identify the target and/or to generate the control signals). Such pre-processing is typically performed at the software level by a general-purpose central processing unit (CPU) in junction with a shared main memory, resulting in slow performance. The improved techniques rely on a hardware-accelerated graphics processing unit (e.g., GPU) to perform the bulk of such image processing, thereby shortening the delay between the image sensor and the tracking module and improving the performance of the overall tracking process.

FIG. 1 illustrates a carrier 100, in accordance with embodiments. The carrier 100 can be releasably (detachably) coupled to a payload 102 and used to control a spatial disposition (pose) of the coupled payload 102. For instance, the carrier can be used to change the orientation of the payload 102 with respect to up to three axes of freedom relative to the carrier, a first axes 104, a second axes 106, and a third axes 108. The payload 102 can include a camera, a smartphone, a tablet computer, or other mobile devices. The payload may be capable of capturing images (e.g., using an image sensor 103 coupled to the payload 102). Furthermore, the payload 102 can be configured to provide control signals to the carrier 100. The control signals can be used to change the spatial disposition of payload 102 in order to track a target in the surrounding environment (e.g., using the image sensor 103).

The carrier 100 can include a payload holder 110, one or more rotation assemblies 114, 118, and 122, a communication unit (not shown) and a carrier controller (not shown). The payload holder 110 can be configured to couple with a payload 102 (e.g., using snap-fit, clamps, brackets, cradles, frames, magnets, etc.). The rotation assemblies can be controlled by the carrier controller to change a spatial disposition of the payload holder 110 (and hence the coupled payload). The communication unit can be configured to receive data from and/or transmit data to the payload, a base support (not shown), and/or any other devices. The controller can be configured to control one or more actuators of the rotation assemblies, for example, based on control signals received by the communication unit. Further details about the communication unit and the controller are discussed in connection with FIG. 4.

In some embodiments, the payload holder 110 can be adapted to accommodate payloads of various dimensions. For instance, the payload holder 110 may include one or more brackets 111 that can be extended or retracted along one or more dimensions. In another example, the payload holder 110 may include a platform that can be magnetically coupled to a side of the payload 102 without the use of any fasteners such as clamps. In some embodiments, the payload can be secured to the payload holder such that the optical axis 105 of the payload is substantially parallel to one of the rotation axes of the carrier (e.g., axis 106). Alternatively, the optical axis 105 may be nonparallel to rotation axes.

The payload holder 110 can be coupled to a first rotation assembly 114 that can be controlled to rotate the payload holder 110 and the payload 102 (when coupled with the payload holder) around a first rotation axis 104. The first rotation assembly 114 can be coupled to a second rotation assembly 118 that can be configured to rotate the first rotation assembly 114, the payload holder 110, and the payload 102 around a second rotation axis 106. The second rotation assembly 118 can be coupled to a third rotation assembly 122 that can be configured to rotate the second rotation assembly 118, the first rotation assembly 114, the payload holder 110, and the payload 102 around a third rotation axis 108.

The first rotation assembly 114 can include a first rotation arm 112 that is coupled to the payload holder 110 and a first actuator (such as a motor, not shown) that can be controlled to cause rotation of the first rotation arm 112 relative to a second rotation arm 116 of the second rotation assembly 118. The second rotation assembly 118 can include the second rotation arm 116 that is coupled with the first rotation assembly 114 and a second actuator (such as a motor, not shown) that can be controlled to cause rotation of the second rotation arm 116 relative to a third rotation arm 120 of the third rotation assembly 122. The third rotation assembly 122 can include the third rotation arm 120 that is coupled with the second rotation assembly 118 and a third actuator (such as a motor, not shown) that can be controlled to cause rotation of the third rotation arm 120 relative to a base support (not shown) that can be coupled to the third rotation assembly 122 (e.g., via a mounting assembly).

A length of a rotation arm of the rotation assemblies may be adjustable along one or more directions (e.g., by a user or by an automated process). Such adjustable rotation arms may be useful for repositioning a center of gravity of at least a portion of the payload, the payload holder, the first rotation assembly, the second rotation assembly, and/or the third rotation assembly closer to a rotation axis of the rotation assemblies so as to provide efficiency. For instance, the second rotation arm 116 can be extended or retracted along one or more directions (e.g., substantially parallel to the first axis 104 or to the second axis 106). Similarly, the third rotation arm 120 can be extended or retracted along one or more directions (e.g., substantially parallel to the second axis 106 or to the third axis 108).

The rotation axes 104, 106, and 108 may be orthogonal axes. Alternatively, the rotation axes may be non-orthogonal axes. In some embodiments, rotation around the rotation axes causes corresponding pitch, yaw, and roll rotations of the coupled payload 102 (and hence the image sensor 103). A pitch axis refers to an axis of rotation that causes a pitch rotation for a payload. Similarly, a yaw axis refers to an axis of rotation that causes a yaw rotation of the payload. And a roll axis refers to an axis of rotation that causes a roll rotation of the payload. A pitch actuator refers to an actuator that is configured to cause a pitch rotation. A yaw actuator refers to an actuator that is configured to cause a yaw rotation. And a roll actuator refers to an actuator that is configured to cause a roll rotation.

The first rotation axis 104, the second rotation axis 106 and the third rotation axis 108 may correspond respectively to a pitch axis, a roll axis, and a yaw axis, respectively. In some other embodiments, the rotation axes 104, 106, 108 may correspond to other ordered combination of axes such as pitch-yaw-roll, roll-pitch-yaw, roll-yaw-pitch, yaw-roll-pitch, or yaw-pitch-roll.

In some embodiments, the carrier 100 can be configured to allow the payload to move relative to the carrier. For instance, the carrier 100 can control the orientation of the payload with respect to less than three axes of freedom. Accordingly, in these embodiments, the carrier may include only a subset of the three rotation assemblies discussed above. For instance, when the carrier is configured to provide two axes of freedom, the carrier may include only two rotation assemblies rotatably coupled to each other, such as the first rotation assembly 114 and the second rotation assembly 118 (to provide rotation around the first axis 104 and the second axis 106), the first rotation assembly 114 and the third rotation assembly 122 (to provide rotation around the first axis 104 and the third axis 108), or the second rotation assembly 118 and the third rotation assembly 122 (to provide rotation around the second axis 106 and the third axis 108). One rotation assembly of the two rotation assemblies can be coupled to a payload holder 110, while the other rotation assembly can be coupled to a base support such as described elsewhere.

Similarly, when the carrier is configured to provide only one axis of freedom, the carrier may include only the first rotation assembly 114 (to provide rotation around the first axis 104), only the second rotation assembly 118 (to provide rotation around the second axis 106), or only the third rotation assembly 122 (to provide rotation around the third axis 108). The rotation assembly can be coupled to a payload holder 110 at one end and a base support such as described elsewhere.

Figure 2:
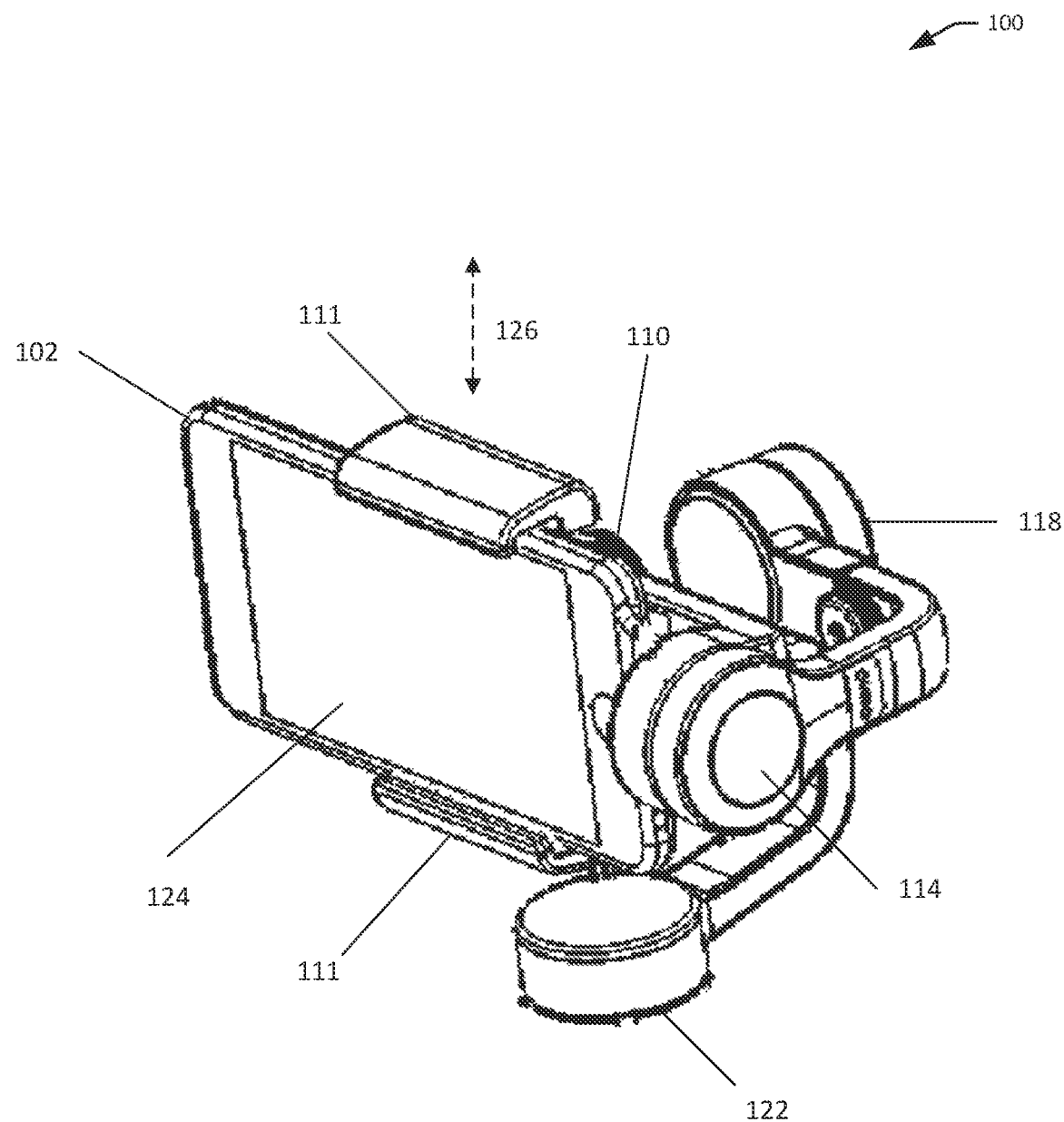
FIG. 2 illustrates another view of the carrier, in accordance with embodiments.

FIG. 2 illustrates another view of the carrier 100, in accordance with embodiments. Specifically, FIG. 2 shows a display 124 of a payload 102 coupled to the carrier 100. The display 124 may be disposed on a different (e.g., opposite) side of the payload from the image sensor 103. Alternatively, the display 124 may be disposed on the same side of the image sensor 103.

The display may be used to provide a user interface provided by an application running on the payload (e.g., a tracking application). In some embodiments, the user interface can be configured to receive inputs from a user (e.g., selection of an object to track or indication of whether to initiate or terminate tracking), as well as displaying output data to the user. The output data can include real-time or nearly real-time images (including still images and videos) captured by one or more image sensors of the payload. The output data can also include non-image data such as an indicator of the tracked target (e.g., a bounded box around the target), information regarding a target being tracked (e.g., location, size, shape of the target), information about a tracking mode or status, and the like.

FIG. 2 also shows, in further detail, a pair of extendable brackets 111 of the payload holder 110. The brackets 111 can be extended to be further away from each other (e.g., along the illustrated dimension 126) to accommodate a larger payload. Similarly, the brackets 111 may be retracted be closer to each other (e.g., along the illustrated dimension 126) so as to accommodate a smaller payload.

Figure 3:
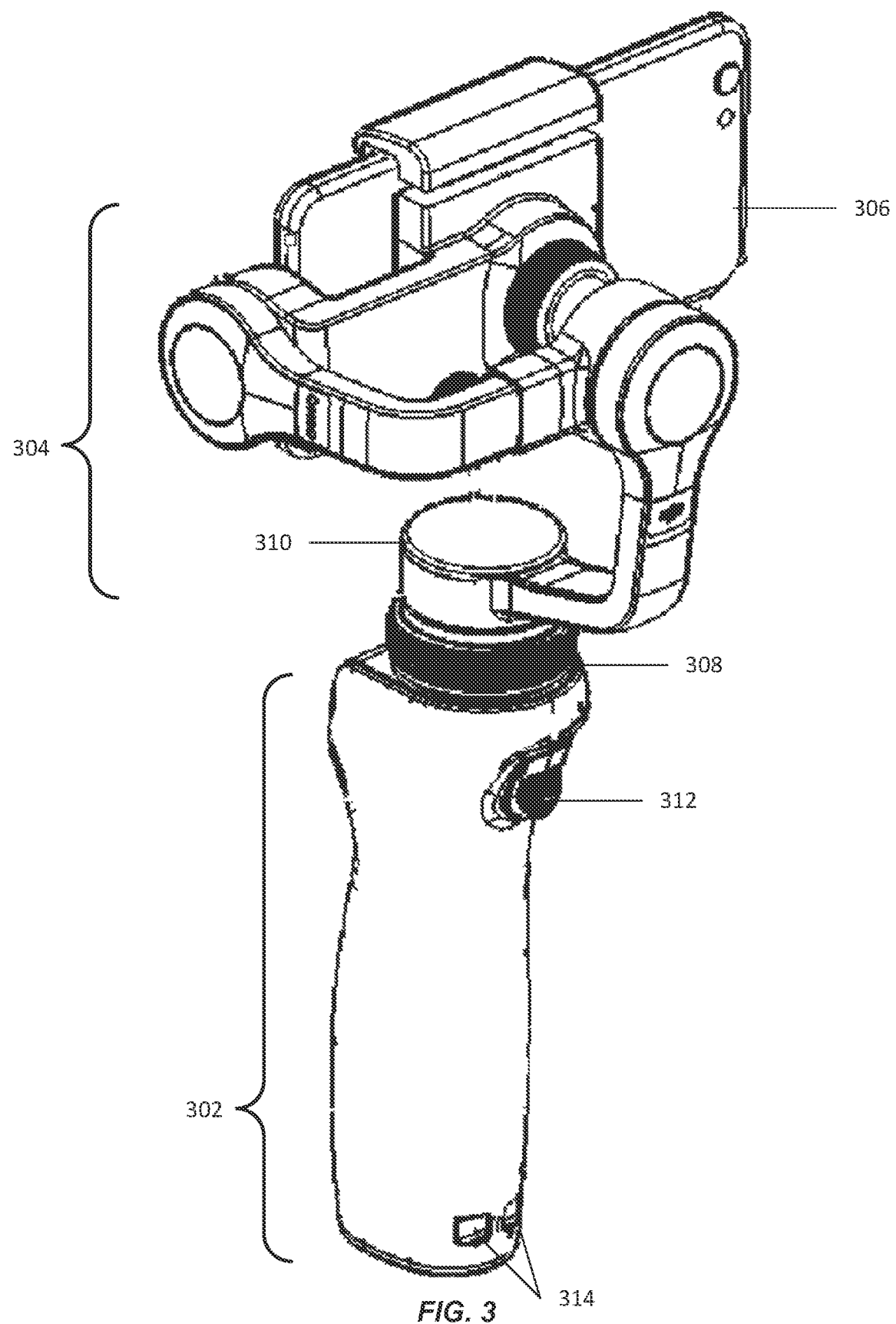
FIG. 3 illustrates a handheld support onto which a carrier can be mounted, in accordance with embodiments.

In various embodiments, the carrier described herein can be mounted onto a suitable base support, which may include a movable object (e.g., a bike, a UAV), a base adapter coupled to a movable object, a tripod, a handheld support, or the like. FIG. 3 illustrates a handheld support 302 onto which a carrier 304 can be mounted, in accordance with embodiments. The carrier 304 can be coupled to a payload 306 in a manner as discussed above. The carrier 304 can be mounted onto a base support 302 via a mounting assembly 308.

In some embodiments, the carrier 304 may be releasably (detachably) coupled to the base support using a quick release coupling mechanism. A quick release coupling mechanism may enable a user to rapidly mechanically couple and/or decouple a plurality of components with a short sequence of simple motions (e.g., rotating or twisting motions; sliding motions; depressing a button, switch, or plunger; etc.).

In some embodiments, the base support 302 may include a communication unit that is configured to support wired and/or wireless communication with the payload 306, the carrier 304, a remote controller, a connected computer, or other external devices. For instance, the base support 302 may include one or more ports 314 to enable data exchange with the external devices.

In some embodiments, the base support 302 may include input/output components. The input components may be used to control or otherwise communicate with a coupled carrier 304, a payload 306, a remote controller, or the like. Examples of such input components can include buttons, levers, joysticks, touch screen, microphone, camera, and the like. For example, one or more control buttons 312 may be used to lock, reset, change, or otherwise control a pose of the carrier. The output components be used to provide output or feedback to a user. For instance, the output components may include a display, a speaker, and the like.

Figure 4:
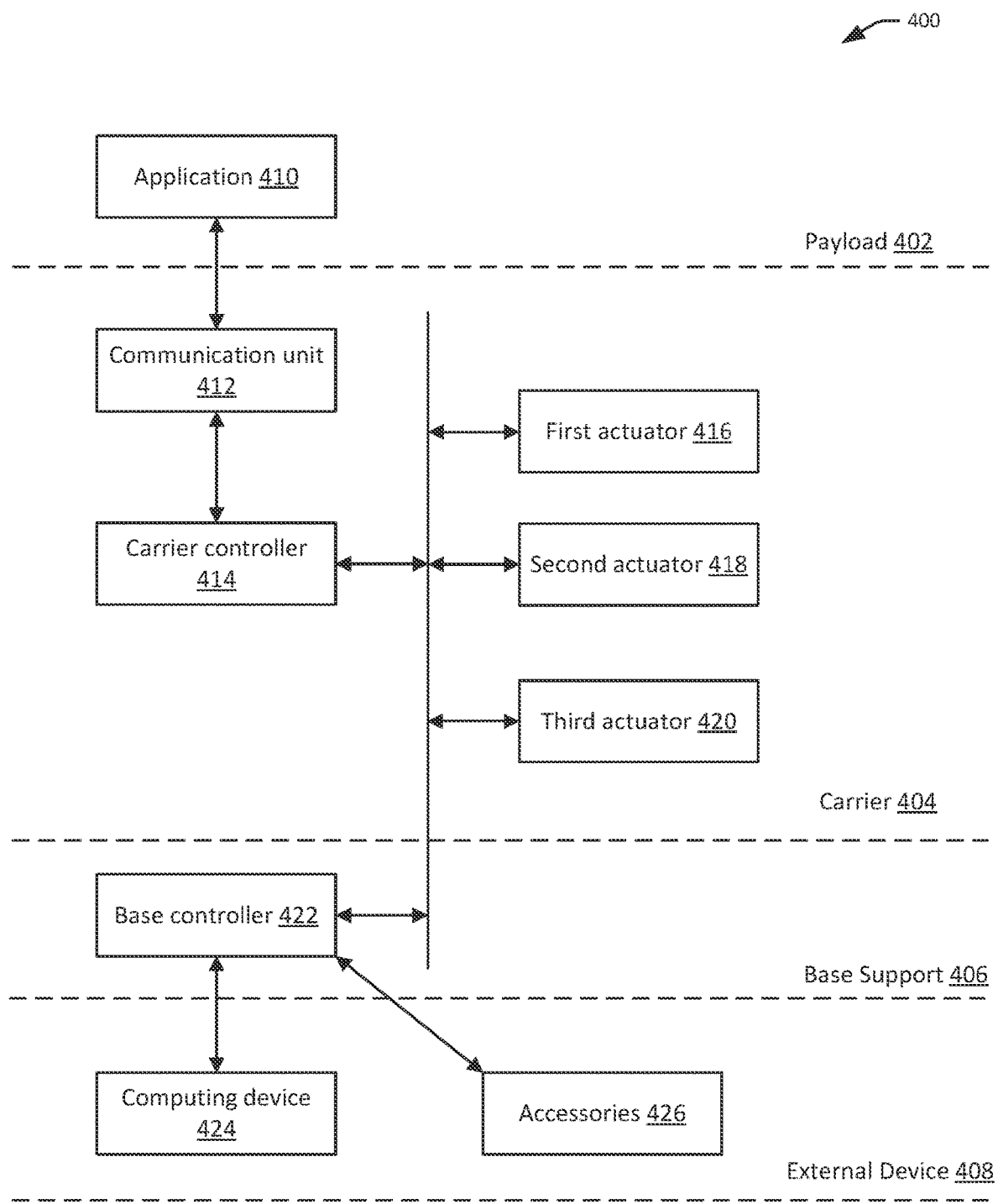
FIG. 4 illustrates exemplary communication between system components, in accordance with embodiments.

FIG. 4 illustrates exemplary communication 400 between components discussed herein, in accordance with embodiments. Specifically, a payload 402 can communicate with a carrier 404 coupled to the payload to control a state of the carrier 404. Optionally, the carrier 404 can also be controlled by a base support 406 coupled to the carrier 404. The base support 406 can be configured to communicate with one or more external devices 408.

The payload 402 can comprise an application 410 configured to transmit control signals to the carrier 404 to cause a change in a pose of the payload 402. As used herein, the terms control signals and control data are used interchangeably to refer to any information useful for controlling a state of a controlled entity (e.g., carrier 404). The terms feedback signals and feedback data are used interchangeably to refer to any information indicative of a state of a controlled entity (e.g., carrier 404). In an embodiment, the application 402 is a tracking application described elsewhere herein. The control signals may be generated by the tracking application based at least in part on a detected deviation of a target from an expected position in an image captured by the payload. A position of a target typically refers to the coordinates of a center point of the target. The control signals may be used to compensate or correct the detected deviation so as to maintain the target at or close to the expected position in a subsequent image captured by the payload.

The carrier 404 can include a communication unit 412, a carrier controller 414, and a plurality of actuators 416, 418, 420. The actuators 416, 418, and 420 may each be part of the respective rotation assemblies described in FIGS. 1-2. The communication unit 412 may be capable of one-way or two-way communication with the payload 402. For instance, the communication unit 412 can be configured to receive the control signals from the payload 402. In some embodiments, the application 410 of the payload 402 provides the control signals to a communication unit (not shown) of the payload 402, which then transmits the control signals to the carrier 404. In some embodiments, the communication unit 412 of the carrier can also be configured to transmit feedback data including state information about the carrier 404 to the payload 402. For example, the state information can a spatial disposition, an acceleration, a velocity, or other information about the carrier or a component thereof. The state information may be generated based on sensor data provided by sensors coupled to the carrier. In various embodiments, the communication between the payload 402 and the carrier 404 may be implemented using a wired connection, a wireless connection, or both. For instance, the transmission of the control signals and/or from the payload 402 to the communication unit 412 of the carrier 404 may be performed using a wireless connection, such as using Bluetooth, Wifi, or near field communication (NFC).

The communication unit 412 and the carrier controller 414 may be attached to any suitable portions of the carrier 404. For instance, the communication unit 412 or the carrier controller 414 may be attached to the payload holder or to any one of the rotation assemblies of the carrier.

The carrier controller 414 can be configured to receive the payload control signals from the payload communication unit 412 and/or transmit carrier feedback signals to the communication unit 412. The communication between the carrier controller 414 and the communication unit 412 may be carried out on in any suitable data form on any suitable communication channel. For instance, in an example, bits of data are transmitted sequentially using universal asynchronous receiver/transmitters (UARTs). Alternatively, bits of data may be transmitted in parallel.

The payload control signals from the payload 402 to the carrier 404 can be used adjust a state of one or more actuators 416, 418, 420 of the carrier 404 so as to change a pose of the payload. A state of an actuator can include an on or off status, an acceleration, a speed, an angular position, and the like. In some embodiments, the control signals can include one, two, more angular velocities for respective actuators. The angular velocities may be actual or expected (perceived) angular velocities. For example, the control signals may include only one angular velocity for an actuator with respect to an axis of rotation of the actuator. The axis of rotation may correspond to or be substantially parallel to a pitch, yaw, or roll axis for the payload. In another example, the control signals may include two angular velocities—a first angular velocity for a first actuator with respect to a first rotation axis and/or a second angular velocity for a second actuator with respect to second rotation axis. The first rotation axis and the second rotation axis may correspond to or be substantially parallel to a pitch axis and a yaw axis, respectively. Alternatively, the first rotation axis and the second rotation axis may correspond to or be substantially parallel to a pitch axis and a roll axis, or a yaw axis and a roll axis. In yet another example, the control signals may include three angular velocities for three different actuators. Alternatively or additionally, the control signals can include one or more angular positions for one or more actuators.

The carrier controller 414 can be configured to generate carrier control signals for some or all of the actuators 416, 418, 420 based on the payload control signals received from the payload 402. The carrier control signals can include any signals for controlling the actuators so as to implement the received payload control signals. The carrier control signals can include, for example, one or more expected or actual values of torque to be applied by respective actuators. For instance, if the payload control signals include an angular velocity with respect to a pitch axis, the carrier controller 414 may generate a torque for the pitch actuator that corresponds to the angular velocity for the pitch axis. Similarly, if the payload control signals include an angular velocity with respect to a yaw axis, the carrier controller 414 may generate a torque for the yaw actuator that corresponds to the angular velocity for the yaw axis. If the payload control signals include an angular velocity with respect to a roll axis, the carrier controller 414 may generate a torque for the roll actuator that corresponds to the angular velocity for the roll axis.

The carrier controller 414 can also be configured to receive feedback signals representing state information for the actuators 416, 418, 420 or other components of the carrier. The feedback signals may include, for example, one or more angular positions of respective actuators with respect to their axes of rotation. In some embodiments, the feedback signals may be used to determine a current state of the actuators or other components of the carrier and/or generate subsequent carrier control signals as discussed below.

In some embodiments, the carrier 404 can comprise one or more carrier sensors (not shown) useful for determining a state of the carrier or the payload 402 carried by the carrier 404. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload 402. In some embodiments, the state information as acquired or calculated from the sensor data may be used as feedback data to control the rotation of the components of the carrier. Examples of such carrier sensors may include motion sensors (e.g., accelerometers), rotation sensors (e.g., gyroscope), inertial sensors, and the like.

The carrier sensors may be coupled to any suitable portion or portions of the carrier (e.g., payload holder, rotation assemblies, and/or actuators) and may or may not be movable relative to the payload. Alternatively or additionally, at least some of the carrier sensors may be coupled directly to the payload carried by the carrier.

The carrier sensors may be coupled with some or all of the actuators of the carrier. For example, three carrier sensors can be respectively coupled to the three actuators for a three-axis carrier and configured to measure the driving of the respective actuators for the three-axis carrier. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator that it measures. For example, a first potentiometer can be used to generate a first position signal for the first actuator, a second potentiometer can be used to generate a second position signal for the second actuator, and a third potentiometer can be used to generate a third position signal for the third actuator. In some embodiments, carrier sensors may also be coupled to some or all of the frame members of the carrier. The sensors may be able to convey information about the position and/or orientation of one or more frame members of the carrier and/or the payload. The sensor data may be used to determine position and/or orientation of an image sensor relative to a payload and/or a reference frame.

The carrier sensors can provide position and/or orientation data that may be transmitted to one or more carrier controller 414, which may be coupled to the carrier and/or to the payload. The sensor data can be used in a feedback-based control scheme. The control scheme can be used to control the driving of one or more actuators such as one or more motors. One or more controllers 414 can generate control signals for driving the actuators. In some instances, the control signals can be generated based at least in part on data received from carrier sensors indicative of the spatial disposition of the carrier or the payload carried by the carrier. Advantageously, the control scheme can be used to provide feedback control for driving actuators of a carrier, thereby enabling more precise and accurate rotation of the carrier components.

Still referring to FIG. 4, the carrier controller 414 can be implemented by one or a collection of controller devices such as microcontrollers, microprocessors, and actuator controllers (also referred to as actuator drivers) such as motor starters, reduced voltage starters, adjustable-speed drives, intelligent motor controllers (IMCs)), and the like. In an example, the carrier controller 414 is implemented at least in part by a microcontroller or microprocessor embedded in an inertial measurement unit (IMU). An actuator controller can include hardware and/or software components suitable for controlling the driving of a corresponding actuator and receiving position signals from a corresponding sensor (e.g., potentiometer).

In some embodiments, the carrier controller 414 is implemented by a single controller device that directly controls a plurality of actuators. In some other embodiments, the carrier controller 414 is implemented by multiple levels of controller devices. For instance, a top-level controller may control a plurality of low-level controllers based on the payload control signals. Each of the low-level controllers may then directly control one or more actuators based on the control signals from the top-level controller. In such an example, the top-level controller may be a microcontroller or a microprocessor and the low-level controllers may be actuator controllers. Alternatively, the low-level controllers may in turn control yet lower-level controllers, which directly control the actuators. And so on.

The carrier control signals can be transmitted simultaneously to actuator controllers or lower-level controllers to produce simultaneous driving of the actuators. Alternatively, the carrier control signals can be transmitted sequentially, or to only one of the actuator controllers or lower-level controllers.

In some embodiments, the carrier controller may be adapted to perform varying levels of computation based on the incoming payload control signals from the payload. The payload control signals may include higher-level or lower-level control information than the angular velocity information discussed above. In some embodiments, the payload control signals from the payload may include relatively high-level control information such as actual and/or expected positions of a tracked target. In this case, the carrier controller would need to perform more complex processing than when the payload control signals include angular velocities. For instance, the carrier controller may be configured determine how to change a pose of the payload in order to maintain the tracked target at or close to the expected position, and the changes to the state of the actuators (e.g., angular velocities) in order to achieve the changed pose. The determination may be based at least in part on a current pose of the payload holder or payload. The current pose may be determined using sensor data from carrier sensors as discussed above. In some examples, the angular velocities may be used to generate torque values for the respective actuators. In some embodiments, the carrier controller may implement a proportional-integral-derivative controller (PID controller) for determining the carrier control signals based on the payload control signals. A similar PID controller may be implemented by the payload instead when the payload provides angular velocity information.

In some embodiments, the payload control signals from the payload may include relatively low-level control information such as torque values for respective actuators. In this case, the carrier controller would need to perform less complex processing than when the payload control signals include angular velocities. In some embodiments, the low-level control information may be provided directly to the actuators or actuators controllers.

The carrier 404 may be optionally coupled to a base support 406 (such as a handheld support 302 of FIG. 3). The base support 406 may include a base controller 422 that communicates with the carrier controller 414 and/or carrier actuators 416, 418, 420. In various embodiments, the carrier controller 414, the base controller 422, and/or the actuators 416, 416, 418 can communicate with each other using a controller area network (CAN) bus or any other suitable communication network.

The base controller 422 may generate control signals for controlling the carrier actuators. For instance, the base controller 422 may generate control signals for the actuators in order to maintain a predetermined pose of the payload carried by the carrier. Alternatively, the base controller 422 may generate control signals for the carrier controller 414, which in turn controls the carrier actuators. The base controller 422 may be configured to generate control signals based on sensor data associated with the carrier 404 or payload 402. The base controller 422 may receive the sensor data from carrier sensors discussed herein. In some embodiments, the base controller may be configured to generate control signals based on local or remote commands. For example, a user may manually control the carrier using buttons, levers, touchscreen, or other user input mechanisms provided by the base support 406. As another example, the base support 406 may be configured to receive control data provided by a remote controller and such control data may be used by the base controller 422 to generate the control signals for the carrier 404.

As discussed above, the carrier 404 may be controlled by the payload 402 alone, by the base controller 422 alone, or by both. In some embodiments, the carrier 404 may be controlled by additional devices such as a remote controller. When the carrier controller 414 receive control signals multiple sources, the carrier controller 414 may be configured to filter, prioritize, or combine the control signals from the different sources. For example, if a user indicates, using an input device connected to the based controller 422, an indication to move the carrier 404, while an application 410 on the payload (e.g., a tracking application) is also controlling the carrier to change a pose of the payload in order to maintain a target at or close to an expected position on a display, then both the base controller 422 and the application 410 may send control signals to the carrier controller 414 at the same time or at different points in time.

The carrier controller may determine whether and/or when to execute the control signals from the application 410 or the base controller 422 based on predetermined priorities. Such preferential treatment of the control signals may be necessary, for example, if the control signals from both sources are intended to control the same actuator or actuators. The control signals from the selected source may be executed, while the control signals from the non-selected source may be ignored all together or deferred to be executed at a later time. Alternatively, the carrier controller may combine the signals from both sources according to predetermined rules or algorithms. For example, if the application intends to control a given actuator to rotate at a first angular velocity and the base controller intends to control the same actuator to rotate at a second angular velocity, then the carrier controller may control the actuator to rotate at an average, a maximum, or a minimum of the first angular velocity and the second angular velocity. As another example, if the application intends to control a first actuator and the base controller intends to control a second, different actuator, then the carrier controller may generate control signals for both the first actuator (based on the control signals from the application) and the second actuator (based on the control signals from the base controller). In some embodiments, the carrier controller may select some of the control signals from a given source for execution but ignores or defer the rest of the control signals from that source.

In some embodiments, the manner in which the carrier controller carries out control signals from multiple sources may be determined by a state of the carrier, the payload, the base support, or the like. The state can include a spatial disposition or pose, an acceleration or speed, an operational state (e.g., tracking mode), and the like. For example, control signals from the payload may take precedent over the control signals from the base support when tracking mode is on. Control signals from the base support take precedent when the base support is moving fast. Additional factors for determining how to carry out control signals from multiple sources may include environmental factors such as geographic location, time, temperature, and the like.

Still referring to FIG. 4, the base controller 422 can optionally communicate with one or more external devices 408 such computing devices 424 and accessories 426. Computing devices 424 can include personal computers (PCs), laptops, tablets, smartphones, game consoles, setup boxes, wearable devices, and the like. Accessories can include memory cards, batteries, displays, tripods, car mounts, extension arms/sticks, mounting adapters, and the like that can be attached to the base support. The base controller 422 may be configured to communicate with the external devices using any suitable wired or wireless communication channel. In an example, the base controller 422 can be connected to the computer 424 using a USB connection and an accessory 426 using a UART connection.

Figure 5:
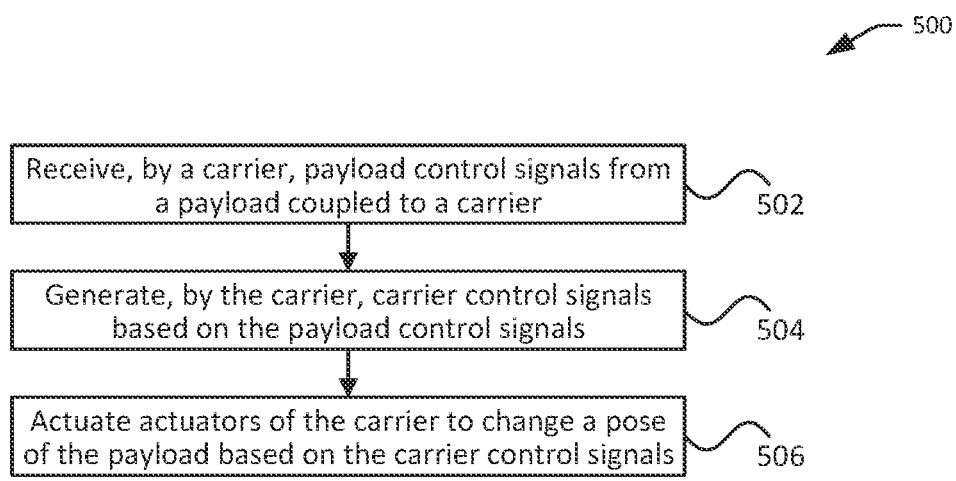
FIG. 5 illustrates an exemplary process for implementing target tracking, in accordance with embodiments.

FIG. 5 illustrates an exemplary process 500 for implementing target tracking, in accordance with embodiments. Aspects of the process 500 may be performed, in some embodiments, by components of a carrier as discussed here. Some or all aspects of the process 500 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 502, a carrier receives one or more payload control signals from a payload coupled to the carrier. The payload may be releasably coupled to the carrier or fixedly coupled to the carrier. The carrier may be configured to allow the payload to move with respect to up to three axes of freedom (e.g., pitch, roll, yaw) as discussed elsewhere herein.

The payload control signals may be received by a communication unit of the carrier using a wired or wireless connection. For example, the payload control signals may be received using a Bluetooth, Wifi, or NFC connection. The connection may support one-way or two-way communication between the payload and the carrier.

The payload control signals may be generated by the payload for the purpose of target tracking. For instance, the payload control signals may be generated in response to detecting a deviation of a target from an expected target position within an image captured by the payload (e.g., using an image sensor). The payload control signals may be used to cause the carrier to change in the pose of the payload so as to reduce or correct the detected deviation, i.e., bringing the target closer to the expected target position in subsequent images captured by the payload.

The payload control signals may comprise information for achieving an expected pose for the payload. Such information may include angular velocities, angular positions, torque to be applied, and the like with respect to some or all of the axes of freedom provided by the carrier. For instance, the payload control signals may include angular velocity information with respect to one, two, or three axes for a three-axis carrier, angular velocity information with respect to one or two axes for a two-axis carrier, and angular velocity information with respect to one axis for a one-axis carrier.

At block 504, the carrier generates one or more carrier control signals based on the payload control signals. In an embodiment, the payload control signals are provided by the communication unit to a carrier controller of the carrier. The carrier controller then generates carrier control signals based on the payload control signals. For instance, the carrier controller may determine a torque to be applied to an actuator based on an angular velocity specified by the payload control signals and a current state of the actuator (e.g., angular position).

The amount of processing performed by the carrier controller may depend on the level of specificity of the payload control signals. The lower or more specific the payload control signals, the less processing of the payload control signals is required on the carrier's part for using those payload control signals to control the actuators. For example, when the payload control signals specify general high-level instructions (e.g., changing a pose of the payload so as to move a target close to an expected position in image), the carrier may need to determine how to change a pose of the payload in order to move the target close to the expected position and how to change the state of respective actuators in order to change the pose. As another example, when the payload control signals specify more specific and lower-level instructions (e.g., apply a particular torque to an actuator), the processing performed by the carrier may be minimal, if at all. In an extreme case, the payload control signals may be provided directly to the actuators or low-level actuator controllers.

At block 506, the carrier actuates the actuators of the carrier to change a pose of the payload based at least in part on the carrier control signals. The carrier control signals can be provided to the actuators or actuator drivers to changing a state of the actuators (e.g., start, stop, angular velocity) so as to cause rotation of one or more components of the carrier. For example, the actuators may cause the payload holder and/or rotation arms of the carrier to move with respect to one or more axes, thereby causing the coupled payload to change an orientation of the payload with respect to the one or more axes.

In some embodiments, changing the pose of the payload allows the payload to better track a specific target. In particular, the payload may capture additional images with the changed pose such that the target is closer to an expected target position in the additional images than in a previous image before the pose change.

Figure 6:
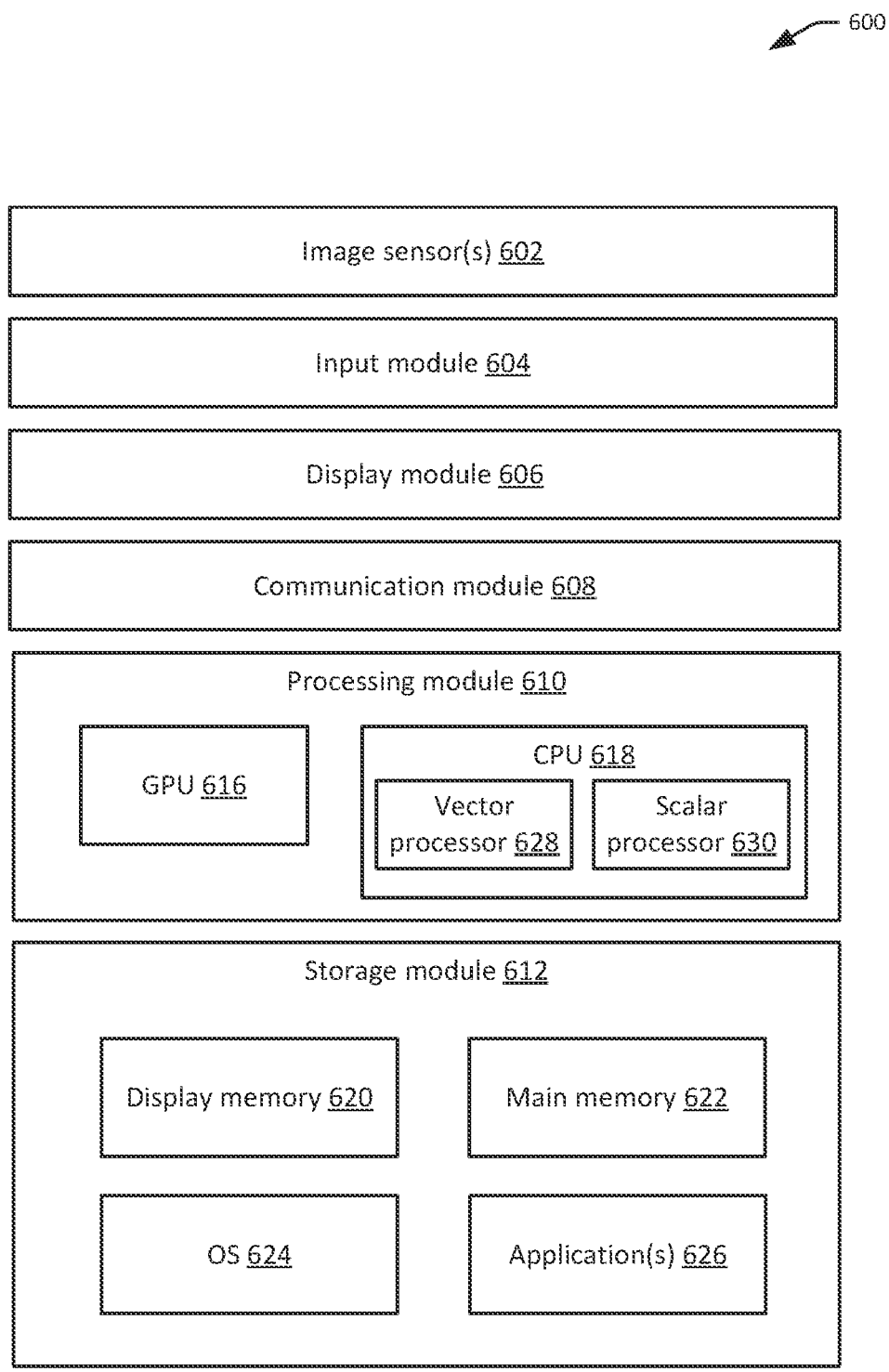
FIG. 6 illustrates exemplary components of a payload, in accordance with embodiments.

FIG. 6 illustrates exemplary components of a payload 600, in accordance with embodiments. In some embodiments, the payload 600 may be a mobile device suitable for capturing images and sending/receiving information in accordance with embodiments described herein. For example without limitation, in various embodiments, the payload 600 may include one or more variously referenced as a mobile phone, a cellular telephone, a smartphone (for example without limitation, a smart phone such as: the iPhone® phone available from Apple Inc. of Cupertino, Calif.; Android™ operating system-based phones, available from as Google of Mountain View, Calif.; and/or the like), a handheld mobile device, a tablet computer, a web pad, a personal digital assistant (PDA), a notebook computer, a handheld computer, a laptop computer, a vehicle computer, and/or the like.

The payload 600 can include one or more image sensors 602, an input module 604, a display 606, a communication module 608, a processing module 610, and a storage module 612, all interconnected via a bus or a similar network.

The image sensors 602 (also referred to as cameras) can be configured to convert optical signals into electronic signals. In various embodiments, the image sensors may include semiconductor charge-coupled devices (CCD), active pixel sensors using complementary metal-oxide-semiconductor (CMOS) or N-type metal-oxide-semiconductor (NMOS, Live MOS) technologies, or any other types of sensors. The image sensor and/or imaging device may be configured to capture pictures, videos, or any other image data with any suitable parameters such as width, height, aspect ratio, megapixel count, resolution or quality, and the like. For example, the imaging device may be configured to capture high-definition or ultra-high-definition videos (e.g., 720p, 1080i, 1080p, 1440p, 2000p, 2160p, 2540p, 4000p, 4320p, and so on).

The image sensors may be fixedly attached to the payload such that the image sensors do not move relative to the rest of payload. In such embodiments, a pose change for the payload translates directly to an equivalent pose change for the image sensors. Alternatively, the image sensors may be movable relative to the payload. In such cases, a pose change for the payload may be used to derive the pose change for the image sensors based on a spatial relationship between the payload and the image sensors.

The input module 604 may one or more input elements to allow a user to input information into payload 600. By way of example without limitation, the input elements may include one or more of a keypad, a trackball, a touchscreen, a touchpad, a pointing device, a microphone, a biometric sensor (e.g., a finger printer reader, a voice recognition device, a camera, a retina reader), or any other suitable mechanisms for the user to provide input. Further, the input elements may be configured to obtain information from an external device. For instance, the input elements may include a card reader capable of reading information from a memory card, a payment card, an identification card, and the like.

The input elements may be used by a user to provide information to a tracking application running on the payload. For instance, the input elements may be used to by a user to indicate whether to start or stop tracking a target and to provide information about a target to be tracked or being tracked by the payload (e.g., using the image sensors). Such information may include initial target information of the target to be tracked (e.g., position, size, color, texture), expected target information for tracking purposes (e.g., expected position or size), and the like. The input elements may also be used for adjusting other aspects of the payload or component thereof such as camera parameters (e.g., zoom, focus), display parameters (e.g., brightness), and the like.

The display module 606 can be configured to display any information to a user. Such information may include information received by the payload such as sensing data (e.g., images captured by the image sensors) or data from an external device (e.g., carrier, base support, another mobile device, remote server). Additionally, the information may include output from an application (e.g., tracking application) running on the payload. In some embodiments, the display module 606 may be implemented by the same device that implements the input module 606 (e.g., a touchscreen). In other embodiments, the display module 606 may be implemented by a device that is separate from (but that may be operatively coupled to) the device that implements the input module 604. In some embodiments, the payload 600 may include other output devices other than the display module 606, such as speakers, data/network ports, and the like.

The communication module 608 can be configured to transmit data to and/or receive data from one or more external devices (e.g., carrier, base support, base station, cellular network, remote server, another mobile device). For example, the communication module 608 can transmit control signals to a carrier coupled to the payload, the control signals used to actuate the carrier so as to change a spatial disposition of the payload. The communication module 608 can also receive information from the carrier such as feedback data indicating a state of the carrier or a component thereof. The communication module 608 can include a transmitter and a receiver respectively configured to transmit and receive data to and from external devices. In some embodiments, the communication module can include a transceiver that combines the functionalities of the transmitter and the receiver. The communication module 608 may include one or more receivers, transmitters, and/or transceivers. The communication module 608 may be configured to support any suitable types of communication including wired or wireless communication. For example, the communication module may include antennas, wireless sensors (e.g., for detecting Bluetooth, NFC, or Wifi signals), radio transceivers, network cards, and the like.

The payload 600 can include a processing module 610. The processing module 610 can have one or more processors or processing units. Some of the processors may be specialized for specific processing tasks. For example, a graphics processing unit (GPU) 616 may include specialized electronic circuit designed to rapidly manipulate and alter memory to accelerate the creation of images in a frame buffer intended for output to a display. Other processors, such as a central processing unit (CPU) 618, may be designed for general-purpose processing and shared by non-graphics related applications. In some embodiments, the processing units may include a field programmable gate array (FPGA) and/or one or more ARM processors.

In some embodiments, the CPU 618 may include one or more vector processors 628 and one or more scalar processors 630. The vector processors 628 can be configured to implement an instruction set containing instructions that operate on one-dimensional arrays of data (vectors). The scalar processors 630 can be configured to implement instructions that operate on single data items. Compared with scalar processors 630, the vector processors 628 can improve the performance of the CPU 618 with concurrency.

The processing module 610 may be operatively connected to the storage module 612. The storage module 612 can include transitory and/or non-transitory storage media configured to store logic, code, and/or program instructions executable by the processing module 610 and/or data. For example, the storage module 612 can store logic, code, and/or program instructions for an operating system (O/S) 624 and one or more applications or routines 626 for implementing any suitable embodiment of the methods described herein. For instance, the applications 626 may include a tracking application that implements the methods described in FIGS. 7-10.

Depending on the configuration and type of the payload 600, the storage media may be volatile (such as random access memory (RAM)) and/or non-volatile (such as read-only memory (ROM), flash memory, etc.). In some embodiments, the storage module 612 can include different types of memory units. For instance, the storage module can include a display memory (also referred to as graphics memory) 620 and a main memory 622. The display memory 620 may be dedicated to the GPU 616 for storing data used by or produced by the GPU 616. Examples of display memory can include extended data output RAM (EDORAM), multibank dynamic RAM (MDRAM), synchronous dynamic RAM (SDRAM), synchronous graphics RAM (SGRAM), video RAM (VRAM), window RAM (WRAM), graphics double data rate synchronous dynamic RAM (GDDR SDRAM), and the like. The main memory 622 may be used by the CPU 618 for storing data used by or produced by various applications 626.

In some embodiments, the payload 600 may optionally include other sensors besides the image sensors 602. For instance, the sensors can include inertial sensors (e.g., accelerometer, gyroscope), orientation sensor (e.g., magnetometer), location sensor (e.g., GPS sensor), proximity sensor (e.g., lidar, infrared), pressure sensor (e.g., barometer), light sensor, touch sensor, and the like. The sensors may be used to determine a state of the payload 600 such as a spatial disposition, velocity, and/or acceleration of the payload 600.

Figure 7:
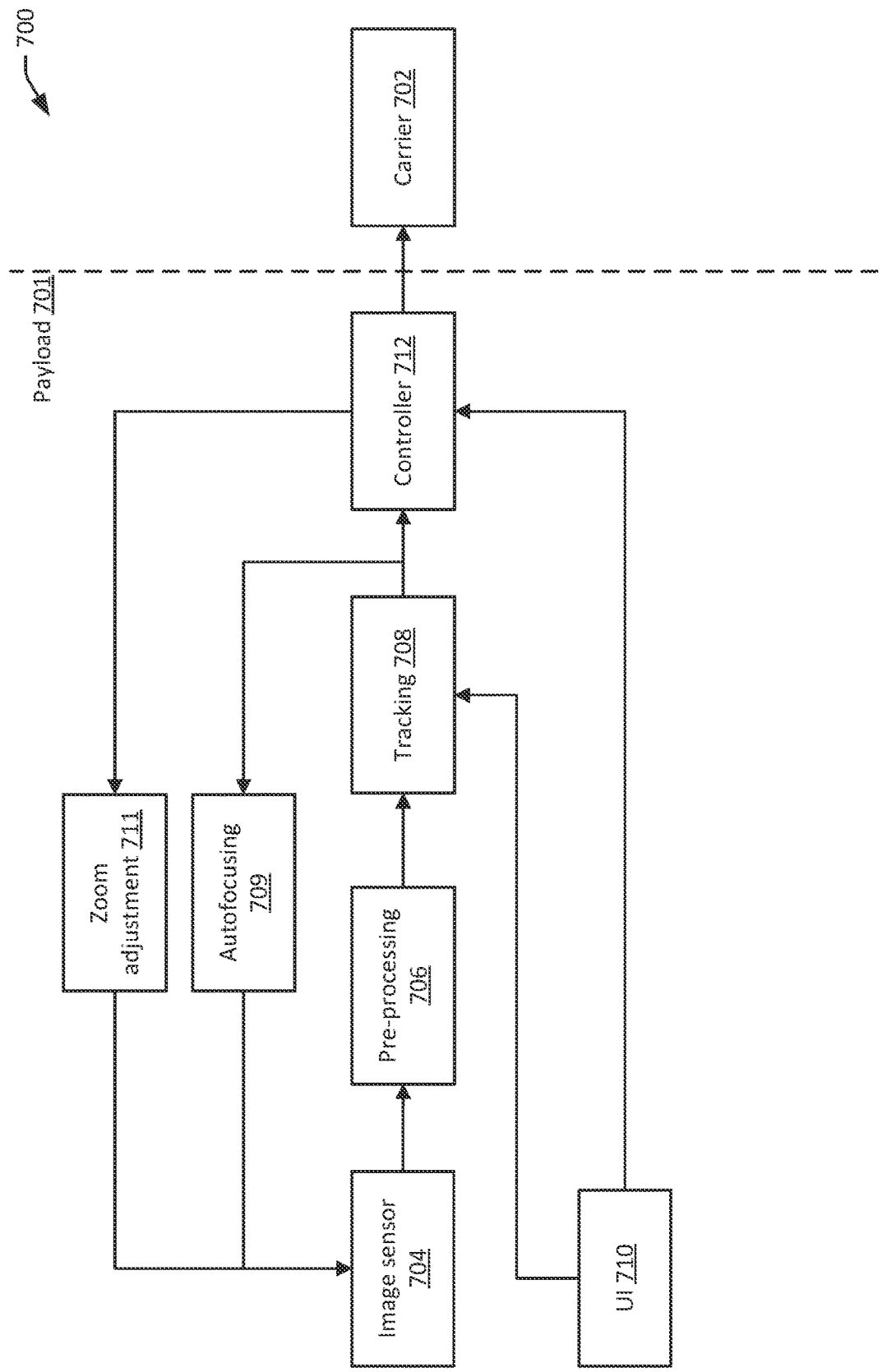
FIG. 7 illustrates an exemplary process for target tracking, in accordance with embodiments.

FIG. 7 illustrates an exemplary process 700 for target tracking, in accordance with embodiments. Aspects of the process 700 may be implemented by a payload 701. The payload 701 can be supported by a carrier 702 that provides up to three axes of freedom for the payload 701, as described elsewhere herein. The payload 701 can be configured to control the carrier 702 to move the payload 701 so as to facilitate target tracking using an image sensor 704 of the payload 701.

The image sensor 704 can be configured to capture images of a surrounding environment of the payload 701. Images captured by the image sensor 704 may be pre-processed by the pre-processing unit 706. The pre-processing unit 706 can include any hardware, software, or a combination thereof. Examples of pre-processing unit 706 can include a GPU, a field programmable gate array (FPGA), and the like. The pre-processing unit 706 can be operatively coupled to the image sensor 704 to pre-processing of the raw image data before the pre-processed image data is used to extract specific piece of information. Examples of tasks performed by the pre-processing unit 706 can include format conversion, re-sampling, noise reduction, contrast enhancement, scale space representation, and the like. In some embodiments, the pre-processing unit 706 may be implemented using the image processing techniques discussed in FIGS. 13-14.

The image data, as pre-processed by the pre-processing unit 706, can be further processed by a tracking unit 708. The tracking unit 708 may be configured to identify a target within one or more images captured by the image sensor 704 based on the pre-processed image data. To that end, the tracking unit 708 may be configured to perform any of the following tasks, including but not limited to, feature extraction at any suitable level of complexity, image segmentation, data verification, image recognition, image registration, image matching, and the like. The tracking unit 708 may be implemented by a processing unit that is operatively coupled to the pre-processing unit 706 (e.g., via a general purpose memory controller (GPMC) connection). The processing unit 706 can include one or more GPUs, CPUs, and the like.

The tracking unit 708 can produce tracking information representing the current state of the target that is being tracked by the payload. The tracking information may include, for example, a current position, size, or other characteristics of a target within one or more images. The tracking information can be used to generate additional data to be superimposed or combined with the original image data. For instance, the tracking information can be used to generate a bounded box or other suitable graphical tracking indicator that is displayed with the tracked object on a display so that the user can see that what is being tracked. The tracking information may be generated based on initial target information provided by a user via the user interface 710 provided by an application of the payload 701. Initial target information may include information about a specific target identified by a user, or general information about a target yet to be identified. For example, in some embodiments, the user interface 710 may display an image captured by the image sensor 704 on a display and a user may interact with the user interface to indicate the target to be tracked on a displayed image. The user may select an area on the display that corresponds to the target. Based on the user interaction, initial target information about the identified target, such as target position (e.g., pixel coordinates), size, and the like, can be determined.

In some embodiments, instead of explicitly identifying a target to be tracked, the user may specify general characteristics about a target to be identified and tracked, such as color, texture, pattern, size, shape, dimension, and the like. Such initial target information about an unidentified target may be used by the tracking unit 708 to automatically search and identify the target to be tracked in the images using any suitable image matching and/or image recognition techniques. In some alternative embodiments, initial target information may not be received from the user interface 710. Instead, the initial target information may be hardcoded in the control logic executed by the tracking unit 708, stored in a data store local and/or remote to the payload 701, or obtained from other suitable sources.

The user interface 710 may also allow a user to specify expected target information, which specifies the characteristics that the target being tracked is expected to maintain in the images captured by image sensor or on a display. Expected target information can include an expected position or size within the images or on the display. For example, the expected position of the tracked target may be at or near the center of an image or display, or off-center. In some embodiments, a user may indicate the expected position of the target by selecting a target on a display and dragging the selected target to the desired position on the display before releasing the touch. The expected size of the tracked target may be about a certain number of pixels. The expected target information may or may not be the same as the initial target information. In some alternative embodiments, expected target information may not be received from the user interface 710. Instead, the expected target information may be hardcoded in the control logic executed by the tracking unit 708, stored in a data store local and/or remote to the payload 701, or obtained from other suitable sources.

The expected target information (e.g., expected target position) and the current target position) can be provided to a controller unit 712. The controller unit 712 can be configured to determine a deviation of the target from the expected state by determining the difference between the current target state (e.g., current target position or size) and the expected target state (e.g., expected target position or size). In response to the detected deviation, the controller unit can generate control signals for controlling the carrier 702 (e.g., one or more angular velocities) and/or control signals for the payload 701 (e.g., to change a zoom or a focus of the image sensor) so as to correct, reduce, or minimize the deviation in subsequent images captured by the image sensor 704. Exemplary processes for correcting a deviation in target position and target size are discussed FIGS. 8 and 9, respectively.

In some embodiments, the controller unit 712 may implement a control loop feedback mechanism such as a proportional-integral-derivative (PID) controller. The PID controller can be configured to calculate an error value as the difference between the current target state (e.g., current target position or current target size) and an expected target state (e.g., expected target position or expected target size), and attempts to minimize the error over time by adjusting a control variable (e.g., an angular velocity or a focal length).

The transfer function for the PID controller can be the following equation:

$$D(s) = k_P + \frac{k_I}{s} + k_D s$$

In the above equation, $k_P$, $k_I$, and $k_D$, denote the coefficients for the proportional, integral, and derivative terms, respectively. The adjustment of the control variable (e.g., angular velocity with respect to a particular axis) to a new value can be determined by a weighted sum:

$$u(t) = k_P e + k_I \int_{t_0}^{t} e(\tau) d\tau + k_D \dot{e}$$

The parameters for the PID controller are typically determined based on values measured in experiments. The new values for the control variables (e.g., angular velocities) can be transmitted to the carrier 702 coupled to the payload 701 as discussed elsewhere herein.

The controller unit 708 may be implemented by a processing unit comprising one or more GPUs, CPUs, and the like. The controlling unit 708 may or may not be implemented by the same processing unit that implements the tracking unit 708.

The payload 701 may optionally implement an autofocusing unit 709, which is configured to automatically improve or correct a focus of the target based on the current target position determined by the tracking unit 708. Any suitable autofocus methods may be used such as phase measurement and contrast detection. In contrast detection, autofocus is achieved by measuring contrast within a sensor field through the lens. The intensity difference between adjacent pixels of the sensor typically increases with correct image focus. The optical system of the camera 704 can therefore be adjusted until the maximum contrast is detected. In a non-limiting example, the contrast information for a tracked target can be measured using the following equation:

$$\text{Variance} = (\Sigma(I(i,j) - I(\text{mean}))^2)/S$$

In the above equation, I(i,j) is the pixel value at target position (i,j), I(mean) is the mean of the pixel values within the target, S is the total number of pixels covered by the target. During the tracking process, the above variance is calculated in real-time for the target. When the variance is reduced, a focal length can be adjusted to increase the variance until the variance reaches the peak convergence and the correct focal length is thus obtained.

Figure 9:
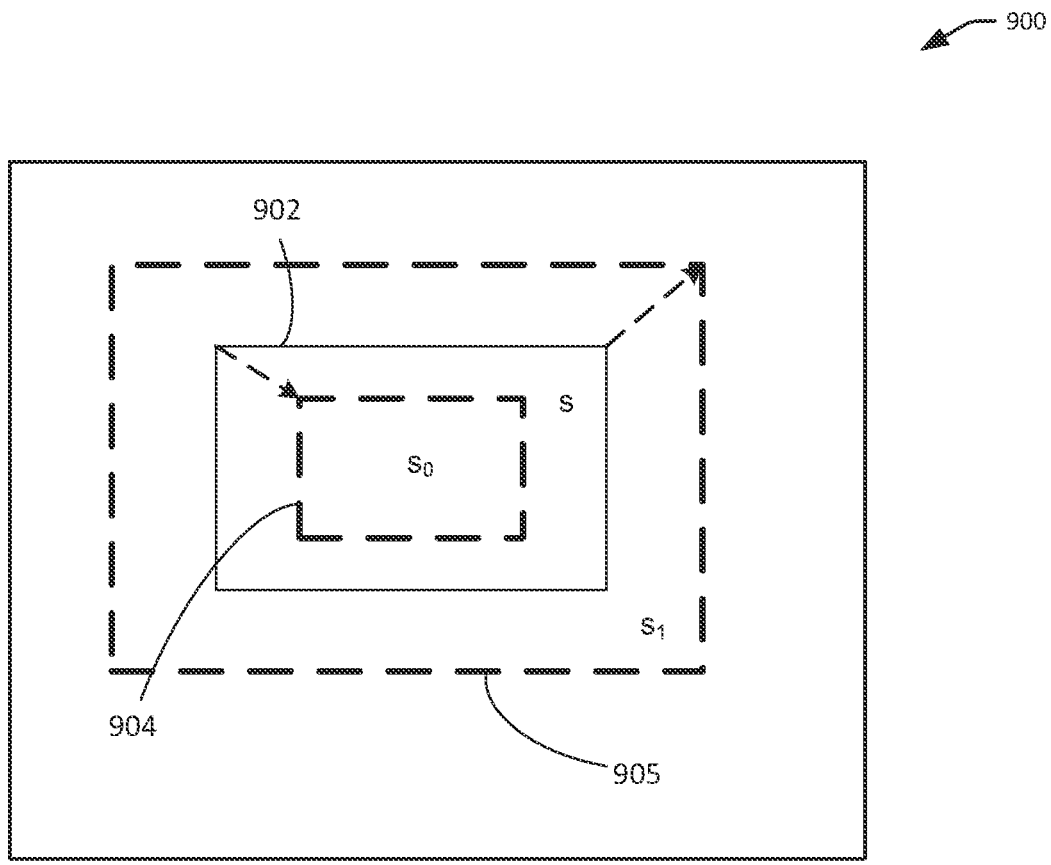
FIG. 9 illustrates an exemplary method for maintaining an expected position of a target within an image, in accordance with embodiments.

In some embodiments, the payload 701 may optionally implement a zoom adjustment unit 711, which is configured to automatically adjust a zoom of the image sensor so as to increase or decrease perceived size of the target based on the current target size and an expected target size, as discussed in further detail in FIG. 9.

The autofocusing unit 709 and the zoom adjustment module 711 may be implemented by one or more processing units comprising one or more GPUs, CPUs, and the like. The autofocusing unit 709 and the zoom adjustment module 711 may or may not be implemented by the same processing unit that implements the tracking unit 708 and/or the controller unit 712.

The illustrated process 700 may be repeat for incoming images during tracking mode so as to continuously generate control signals for adjusting the carrier 702 in order to track a target. While FIG. 700 illustrates obtaining the initial target information and the expected target information from the user interface 710, it is understood that user input no longer required once the initial target information and expected target information is obtained from the user interface 710. Instead, the initial target information and/or expected target information can be stored in a storage module. The tracking unit 708 and the controller unit 702 can retrieved the stored initial target information and/or expected target information from the storage module instead of from the user interface 710 for tracking the target in subsequent images, until the user decides to change the initial and/or expected target information.

In some alternative embodiments, some portion of the processing discussed above may be performed by the carrier 702 instead of the payload 701. For example, the controller 712 may be implemented by the carrier 702 instead of the payload 701. Instead of providing angular velocity information to the carrier 702, the payload 701 may be configured to provide the current target information (output from the tracking unit 708) and the expected target information to the carrier 702, which then determines the angular velocities for respective axes based on the current and expected target information using logic similar to that implemented by the controller 712 discussed above.

Figure 8:
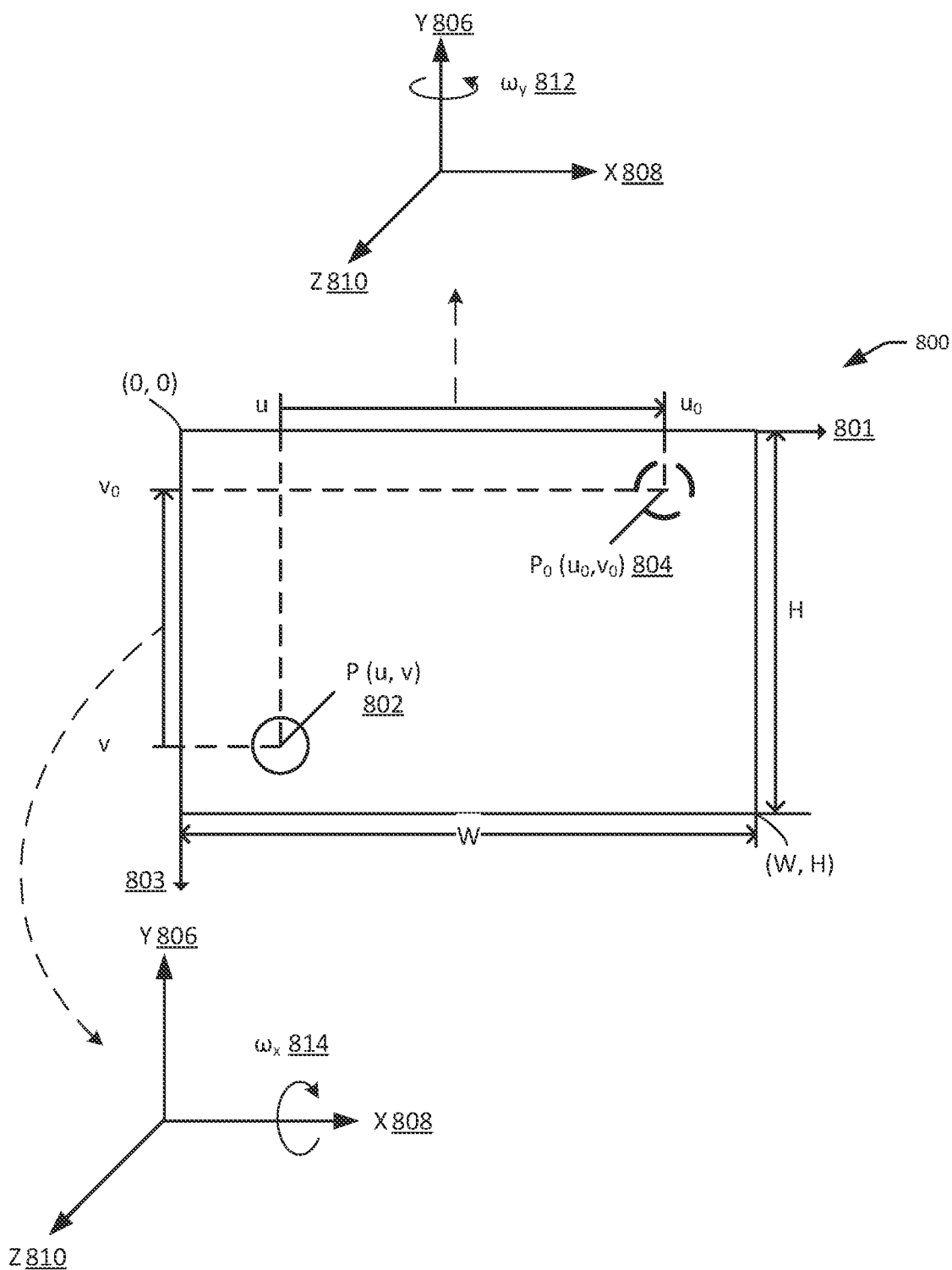
FIG. 8 illustrates an exemplary method for maintaining an expected position of a target within an image, in accordance with embodiments.

FIG. 8 illustrates an exemplary method for maintaining an expected position of a target within an image 800, in accordance with embodiments. The image may be captured by an imaging device (e.g., image sensor) of a payload. The payload may be coupled to a carrier that allows the payload to move relative to the carrier with respect to up to three axes of freedom, as described herein. Assume that the image has a width of W pixels and a height of H pixels (where W and H are positive integers). A position within the image can be defined by a pair of coordinates along a horizontal axis 801 (along the width of the image) and a vertical axis 803 (along the height of the image), where the upper left corner of image has coordinates (0, 0) and the lower right corner of the image has coordinates (W, H).

Assume that a target, as captured in the image 800, is located at position P (u, v) 802, and the expected position of the target is $P_0$ ($u_0$, $v_0$) 804 that is different from P 802. In some embodiments, the expected position of the target $P_0$ ($u_0$, $v_0$) may be near the center of the image, such that $u_0=W/2$, and/or $v_0=H/2$. In other embodiment, the expected position of the target may be located anywhere else within the image (e.g., off-center). In various embodiments, the expected position of the target may or may not be the same as the initial position of the target. Assuming that the current position P is deviated from the expected position $P_0$ such that the deviation exceeds a predetermined threshold (such as expressed by a $\Delta x$ from $u_0$, and a $\Delta y$ from $v_0$), then an adjustment is required to bring the target position from P to close to the expected position $P_0$.

In some embodiments, the deviation from the expected target position can be used to derive one or more angular velocities for rotating the field of view of the imaging device (e.g., image sensor) around one or more axes. For example, deviation along the horizontal axis 801 of the image (e.g., between u and $u_0$) may be used to derive an angular velocity $\omega_Y$ 812 for rotating the field of view of the imaging device around the Y (yaw) axis 806, as follows:

$$\omega_Y = \alpha^*(u - u_0), \text{ where } \alpha \in \mathbb{R} \text{ (real numbers)} \quad (1)$$

The rotation around the Y axis for the field of view of an imaging device may be achieved by a rotation of the payload (via the carrier). In the equation (1), α is a constant that may be predefined and/or calibrated based on the configuration of the carrier. In some embodiments, α is greater than zero (α>0). In other embodiments, α may be no greater than zero (α≤0). In some embodiments, a can be used to map a calculated pixel value to a corresponding control lever amount or sensitivity for controlling the angular velocity around a certain axis (e.g., yaw axis). In general, the control lever may be used to control the angular or linear movement of a controllable object (e.g., the carrier). Greater control lever amount corresponds to greater sensitivity and greater speed (for angular or linear movement). In some embodiments, the control lever amount or a range thereof may be determined by configuration parameters of a control system for the carrier. The upper and lower bounds of the range of the control lever amount may include any arbitrary numbers. For example, the range of the control lever amount may be (1000, −1000) for one control system and (−1000, 1000) for another control system.

As an example, assume that the images have a width of W=1024 pixels and a height of H=768 pixels. Thus, the size of the images is 1024*768. Further assume that the expected position of the target has a $u_0=512$. Thus, $(u-u_0) \in (-512, 512)$. Assume that the range of the control lever amount around the yaw axis is (−1000, 1000), then the maximum control lever amount or maximum sensitivity is 1000 and α=1000/512. Thus, the value of a can be affected by image resolution or size provided by the imaging device, range of the control lever amount (e.g., around a certain rotation axis), the maximum control lever amount or maximum sensitivity, and/or other factors.

As illustrated herein, the direction of the rotation around the Y (yaw) axis may depend on the sign of $u-u_0$. For instance, if the expected position is located to the right of the actual position (as illustrated in FIG. 8), then $u-u_0<0$, and the field of view needs to rotate in a counter-clockwise fashion around the yaw axis 806 (e.g., pan left) in order to bring the target to the expected position. On the other hand, if the expected position is located to the left of the actual position, then $u-u_0>0$, and the field of view needs to rotate in a clockwise fashion around the yaw axis 806 (e.g., pan right) in order to bring the target to the expected position.

As illustrated herein, the speed of rotation (e.g., absolute value of the angular velocity) around a given axis (e.g., the Y (yaw) axis) may depend on the distance between the expected and the actual position of the target along the axis (i.e., $|u-u_0|$). The further the distance is, the greater the speed of rotation. Likewise, the closer the distance is, the slower the speed of rotation. When the expected position coincides with the position of the target along the axis (e.g., $u=u_0$), then the speed of rotation around the axis is zero and the rotation stops.

The method for adjusting the deviation from the expected target position and the actual target position along the horizontal axis 801, as discussed above, can be applied in a similar fashion to correct the deviation of the target along a different axis 803. For example, deviation along the vertical axis 803 of the image (e.g., between v and $v_0$) may be used to derive an angular velocity $\omega_X$ 814 for the field of view of the imaging device around the X (pitch) axis 808, as follows:

$$\omega_X = \beta^*(v-v_0), \text{ where } \beta \in \mathbb{R} \qquad (2)$$

The rotation around the X axis for the field of view of an imaging device may be achieved by a rotation of the payload (via a carrier). Hence, in the equation (2), $\beta$ is a constant that may be predefined and/or calibrated based on the configuration of the carrier. In some embodiments, $\beta$ is greater than zero ($\beta>0$). In other embodiments, $\beta$ may be no greater than zero ($\beta \leq 0$). In some embodiments, $\beta$ can be used to map a calculated pixel value to a corresponding control lever amount for controlling the angular velocity around a certain axis (e.g., pitch axis). In general, the control lever may be used to control the angular or linear movement of a controllable object (e.g., carrier). Greater control lever amount corresponds to greater sensitivity and greater speed (for angular or linear movement). In some embodiments, the control lever amount or a range thereof may be determined by configuration parameters of a carrier control system for a carrier. The upper and lower bounds of the range of the control lever amount may include any arbitrary numbers. For example, the range of the control lever amount may be (1000, −1000) for one control system and (−1000, 1000) for another control system.

Continue with the above example where the images have a width of W=1024 pixels and a height of H=768 pixels, assume that the expected position of the target has a $v_0$=384. Thus, $(v-v_0) \in (-384, 384)$. Also assume that the range of the control lever amount around the pitch axis is (−1000, 1000), then the maximum control lever amount or maximum sensitivity is 1000 and $\beta$=1000/384. Thus, the value of $\beta$ can be affected by image resolution or size provided by the imaging device, range of the control lever amount (e.g., around a certain rotation axis), the maximum control lever amount or maximum sensitivity, and/or other factors.

As illustrated herein, the direction of the rotation around the X (yaw) axis may depend on the sign of $v-v_0$. For instance, if the expected position is located above of the actual position (as illustrated in FIG. 8), then $v-v_0>0$, and the field of view needs to rotate in a clockwise fashion around the pitch axis 808 (e.g., pitch down) in order to bring the target to the expected position. On the other hand, if the expected position is located to below the actual position, then $v-v_0<0$, and the field of view needs to rotate in a counter-clockwise fashion around the pitch axis 608 (e.g., pitch up) in order to bring the target to the expected position.

As illustrated herein, the speed of rotation (e.g., absolute value of the angular velocity) depends on the distance between the expected and the actual position of the target (i.e., $|v-v_0|$) along a give axis (e.g., the X (pitch) axis). The further the distance is, the greater the speed of rotation. The closer the distance is, the slower the speed of rotation. When the expected position coincides with the position of the target (e.g., $v=v_0$), then the speed of rotation is zero and the rotation stops.

In some embodiments, the values of the angular velocities as calculated above may be constrained or otherwise modified by various constraints of the system. Such constraints may include the maximum and/or minimum speed that may be achieved by the carrier, the range of control lever amount or the maximum control lever amount or maximum sensitivity of the control system for the carrier, and the like. For example, the rotation speed may be the minimum of the calculated rotation speed and the maximum speed allowed.

In some embodiments, warning indicators may be provided when the calculated angular velocities need to be modified according to the constraints described herein. Examples of such warning indicators may include textual, audio (e.g., siren or beeping sound), visual (e.g., certain color of light or flashing light), mechanical, any other suitable types of signals. Such warning indicators may be provided directly by the carrier. Alternatively or additionally, warning indicators may be provided by the payload (e.g., via a display).

FIG. 9 illustrates an exemplary method for maintaining an expected position of a target within an image 900, in accordance with embodiments. An exemplary image 900 is shown such as captured by an imaging device (e.g., image sensor) supported by a carrier. Assume that a target 902 is captured by the image 900. The actual size of the target within the image can be s pixels (such as calculated as the product of the width of the target and the height of the target). The expected target size S may be smaller (e.g., the expected target may be represented by 904 and $S=s_0$) or larger (e.g., the expected target may be represented by 905 and $S=s_1$) than the actual size s. The expected size of the target may or may not be the same as the initial size of the target (e.g., as received from a user interface). Assuming that the current size s is deviated from the expected size $s_0$ or $s_1$ such that the deviation exceeds a predetermined threshold (such as a predefined $\Delta s$ pixels), then an adjustment is required to bring the target size close to the expected size $s_0$ or $s_1$.

Although display area of the image and target is shown as rectangles, it is for illustrative purposes only and not intended to be limiting. Rather, the display area of the image and/or target may be of any suitable shapes in various embodiments such as circles, ovals, polygons, and the like. Likewise, although the areas discussed herein are expressed in pixels, these are for illustrative purposes only and not intended to be limiting. In other embodiments, the areas may be expressed in any suitable units such as megapixels, mm$^2$, cm$^2$, inch$^2$, and the like.

The deviation between the actual target size and the expected target size can be used to derive adjustment to the operational parameters of the imaging device such as a zoom level or focal length in order to correct the deviation. An exemplary focal length adjustment F can be expressed as:

$$F = \gamma^*(1-s/S), \text{ where } \gamma \in \mathbb{R} \qquad (3)$$

Where $\gamma$ is a constant that is defined based on the configuration of the imaging device. In some embodiments, $\gamma$ is greater than zero ($\gamma>0$). In other embodiments, $\gamma$ is no greater than zero (γ≤0). The value of γ may be defined based on the types of lenses and/or imaging devices.

If the actual size s of the target is smaller than the expected size S, then F>0 and the focal length increases by |F| so as to increase the size of the target as captured in the images. On the other hand, if the actual size s of the target is larger than the expected size S, then F<0 and the focal length decreases by |F| so as to reduce the size of the target as captured in the images. For example, in an embodiment, γ=10. This means that, for example, when the actual size of the target is double the size of the expected size S, the focal length should be decreased by 10 mm accordingly (i.e., F=10*(1−2/1)=−10) and vice versa.

In some embodiments, the adjustment to the operational parameters of the imaging device such as focal length may be constrained or otherwise modified by various constraints of the system. Such constraints may include, for example, the maximum and/or minimum focal lengths that may be achieved by the imaging device. As an example, assume the focal length range is (20 mm, 58 mm). Further assume that the initial focal length is 40 mm. Then when s>S, the focal length should be decreased according to equation (3); and when s<S, the focal length should be increased according to equation (3). However, such adjustment is limited by the lower and upper bounds of the focal length range (e.g., 20 mm to 58 mm). In other words, the post-adjustment focal length should be no less than the minimum focal length (e.g., 20 mm) and no more than the maximum focal length (e.g., 58 mm).

As discussed above in FIG. 8, warning indicators may be provided when the calculated adjustment (e.g., focal length) is modified or otherwise constrained according to the constraints described herein. Examples of such warning indicators may include textual, audio (e.g., siren or beeping sound), visual (e.g., certain color of light or flashing light), mechanical, any other suitable types of signals. In an example, such indicators may be provided by the payload (e.g., via the display).

Figure 10:
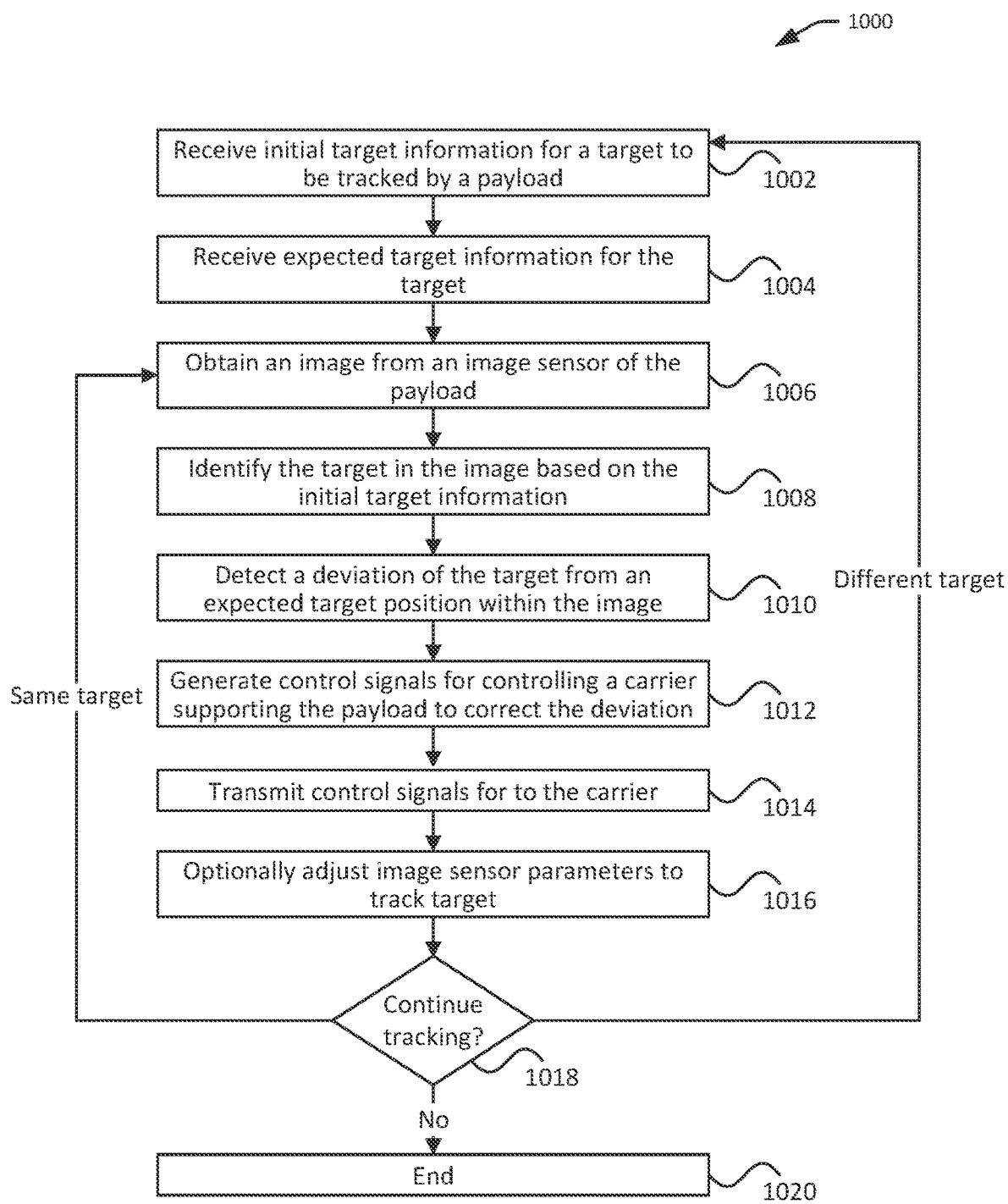
FIG. 10 illustrates an exemplary process for implementing target tracking, in accordance with embodiments.

FIG. 10 illustrates an exemplary process 1000 for implementing target tracking, in accordance with embodiments. Aspects of the process 1000 may be performed, in some embodiments, by components of a payload as discussed here. The payload may be supported by a carrier that allows the payload to move around up to three axes. In some embodiments, the payload may be configured to track a target in images captured by the payload and control the carrier to change the pose of the payload so as to approximately maintain an expected target position in the images. Optionally, the payload may be configured to adjust aspects the image sensor so as to approximately maintain an expected size of the target within the images and/or to improve the focus on the target.

At block 1002, initial target information for a target to be tracked is received by a payload. The initial target information may include characteristics (e.g., pixel position, size) associated with a specifically-identified target or those associated with a yet-to-be identified target. The initial target information may be received from a user interface provided by an application running on the payload. For example, a user may interact with the user interface by touching or otherwise selecting a region associated with a desired target on an image displayed by the user interface using a finger, a stylus, or any other suitable input device. The image may have been previously captured by an image sensor of the payload. Based on the user interaction, the initial target information can be determined. In some other embodiments, the user interface may allow a user to enter information about a yet-to-be-identified target such as size, color, texture, and the like. In some embodiments, the initial target information may be obtained using mechanisms other than a user interface. For instance, the initial target information may be preloaded in the payload or provided by another device (e.g., peer device, controller, server).

At block 1004, expected target information for the target is received. The expected target information may include an expected position of the target (e.g., pixel coordinates within an image or on a display), an expected size of the target, or other expected characteristics of the tracked target within the captured images or on a display. The expected target information may be specified by a user using a user interface of the payload using any suitable input device (e.g., touchscreen, stylus), or received from another device.

At block 1006, an image is obtained from the image sensor. The image may be the same image that is used by the user to indicate the initial target information and/or expected target information, or it may be a different image. In some embodiments, raw image data from the image sensor may be preprocessed, such as described in FIGS. 13-14, so that the preprocessed image data can be used by other processing units for target tracking.

At block 1008, the target is identified in the image based on the initial target information. For example, if the initial position and the initial size of the target is known, then a limited search may be performed near the initial position in the image for an object of the initial size. Other initial target information such as color and texture may also be used to identify the target. In some embodiments, the initial target information may be updated over time based on previous image processing results. For instance, the initial target information may be updated to reflect the characteristics of the target in the last image where the target was identified. Additional features of the target may be extracted from the images and used to facilitate more efficient (e.g., faster and/or requiring less computation) target identification.

In some embodiments, a graphical tracking indicator (e.g., a bounded box, oval, circle, or other geometric shape) may be displayed on the image to show the current position of the target within the image. The graphical tracking indicator can be updated with each new image to track the position of the target in the new image.

At block 1010, a deviation of the target from an expected target position within the image is detected. Once the target is identified, the target's current information (e.g., current position, current size) can be determined. The current target information can be compared with the expected target position to determine if there is a deviation. In some embodiments, one or more predetermined thresholds may be used to determine if there is a deviation. For instance, a displacement of the current target position from the expected target position by less than a threshold number of pixels A (e.g., 5 pixels) may not be considered a deviation in target position. Only when the displacement is equal or greater than the predetermined threshold A is it considered a deviation. Similarly, a change in size from the expected target size of less than a threshold number of pixels B (e.g., 10 pixels) may not be considered a deviation in target size. Only when the change is equal or greater than the predetermined threshold B is it considered a deviation.

At block 1012, one or more control signals are generated for controlling a carrier supporting the payload to correct the deviation in subsequent images captured by the payload. A correction of the deviation includes a complete correction, where there is no longer any deviation, or a partial correction where the deviation is reduced. The control signals may be used to cause (directly or indirectly) a change of pose of the payload (and hence the field of view of the image sensor of the payload) with respect to one or more axes. For example, as discussed herein, the control signals may include an angular velocity with respect to a yaw axis to correct a horizontal displacement and/or an angular velocity with respect to a pitch axis to correct a vertical displacement.

At block 1014, the control signals are transmitted to the carrier. The control signals may be transmitted by a communication module discussed in FIG. 6 and received by a communication unit 412 of the carrier discussed in FIG. 4. The control signals may be transmitted via a wired or wireless connection (e.g., Bluetooth, Wifi, NFC).

At block 1016, parameters of the image sensor may be optionally adjusted, where necessary, to better track the target. The parameters may include a focal length, zoom level, image mode, image resolution, depth of field, exposure, lens speed, field of view, and the like. For example, if a deviation from an expected target size is detected, a focal length of the image sensor may be changed (e.g., zoom in or zoom out) to increase or decrease the size of the target in subsequent images, such as described in FIG. 9. As another example, a focus of the target may be improved using any suitable autofocus techniques, such as described in FIG. 7.

At block 1018, it is determined whether to continue tracking. The determination may be based on a user input via the user interface. For instance, the user may indicate that tracking is to be terminated by touching a "stop" button on the user interface or by a controller (e.g., a base support coupled to the carrier). The process 1000 ends at block 1020 if tracking is stopped. In some cases, a user may also indicate whether to change the tracking target, for example, by touching or selecting a different object on the display and selecting "start". If a different target is to be tracked, then the process 1000 loops back to block 1002, where initial and/or expected target information is obtained. If the same target is to be tracked (e.g., the user did not terminate tracking or select a different target to track), then the process 1000 loops back to block 1006.

Advantageously, the described system, methods, and apparatus provide simple yet effective tracking of targets by payloads (e.g., smartphones). By directly controlling a carrier of the payload to adjust the pose of the payload, the payload can achieve faster and more precise pose change that provided by a human user, resulting in more effective tracking.

According to another aspect of the present disclosure, techniques are provided for optimizing image processing. Specifically, the described techniques can be used to optimize the transformation of the raw image data acquired by the image sensor to a different form (e.g., size and/or format) that is required by a target process (i.e., a process that takes as input the transformed data). The processing of the raw image data can include resampling to change the pixel size of the image data, converting the image data from one color format to another, and the like. As discussed in connection with FIG. 7, raw image data captured by the image sensor typically need to be processed or transformed (e.g., by the pre-processing unit 706) so as to render the image data suitable for further processing (e.g., by the tracking unit 708 and the controller unit 712 of a tracking application). The speed at which the raw image data is transformed may be important for the target process. For example, the tracking application may need to receive a correctly-formatted image soon after the capture of the image by an image sensor, in order to identify a moving target within the image, refresh the image on a display to show (e.g., with a bounded box) the target, and generate control signals for a carrier and/or an image sensor to continue tracking of the target in a nearly real-time manner.

Existing technologies typically use shared and/or general-purpose computing resources, such as CPU and main memory, for the majority of such image transformation, resulting in slow performance and inefficient use of resources. The performance slowdown can be significant for a tracking application, where a large amount of images need to be processed within a short amount of time in order to facilitate real-time or nearly real-time tracking of a target.

The described techniques improve the performance of such image processing by moving the bulk of such image processing away from general-purpose computing resources to dedicated and specialized computing resources, such as GPU, vector processors, and display memory, reducing stalls or delays caused by contention of the shared resources. Additionally, the described techniques use hardware resources (e.g., GPU) to accelerate some of the image processing steps typically implemented in software.

Figure 11:
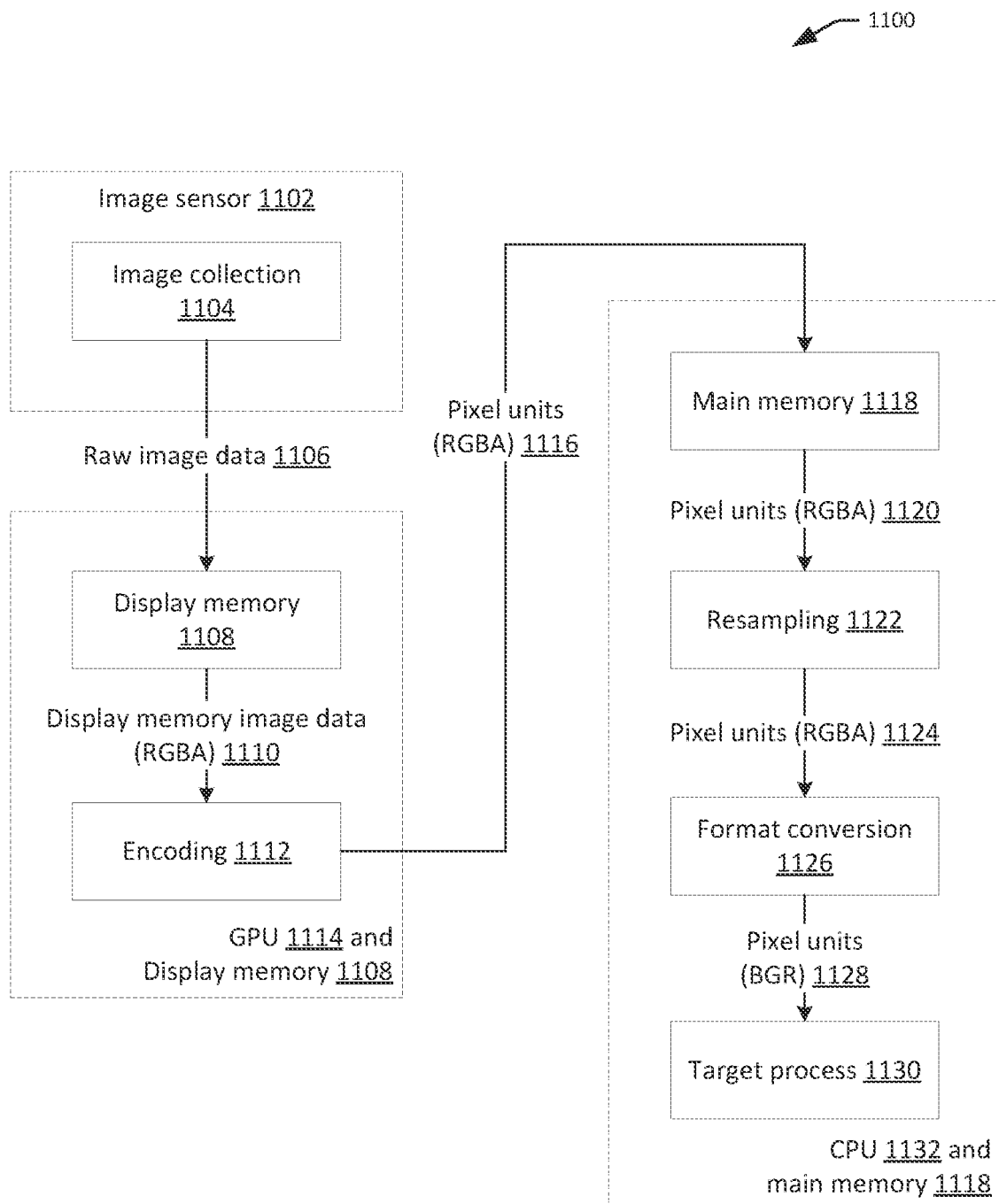
FIG. 11 illustrates a first exemplary process for image processing using existing technologies, in accordance with embodiments.
Figure 12:
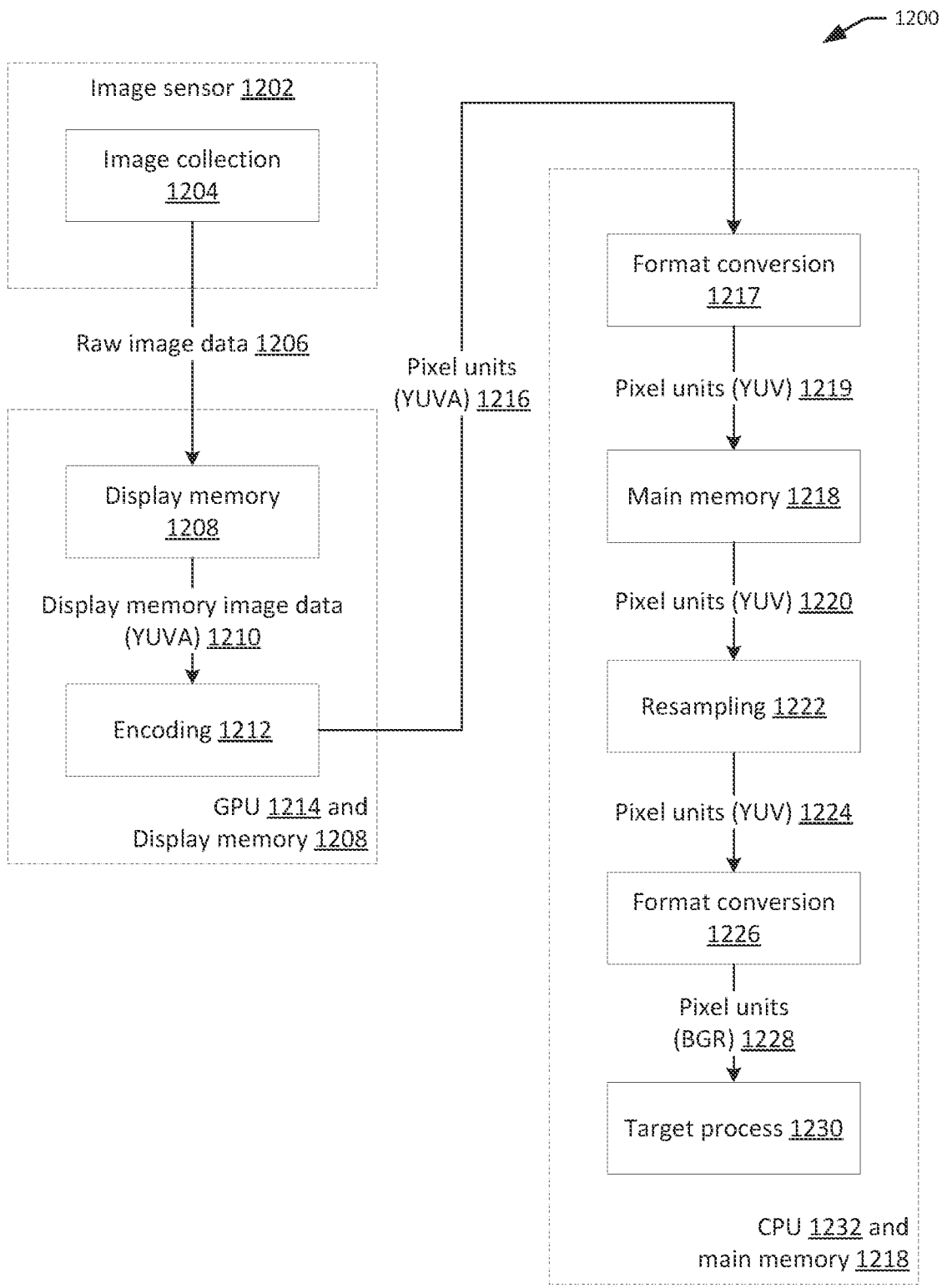
FIG. 12 illustrates a second exemplary process for image processing using existing technologies, in accordance with embodiments.

FIGS. 11-12 illustrate exemplary image processing performed by existing technologies. FIG. 11 illustrates a first exemplary process 1100 for image processing using existing technologies, in accordance with embodiments. In an example, the process 1100 may be implemented by an iOS device. As illustrated, an image sensor 1102 of the device can capture images and output raw image data 1106 (e.g., using an image collection module 1104). The raw image data 1106 may be digitized and may include image pixel data (e.g., grayscale value or color information for each pixel) and image metadata (e.g., camera settings such as camera model and serial number, shutter speed, aperture, focal length, resolution).

The raw image data 1106 may be stored in a display memory 1108 associated with a GPU 1114. The display memory 1108 may be dedicated to be used by only the GPU 1114 or shared with other processing units. The GPU 1114 may be configured to implement an encoding 1112 module, which retrieves a set of display memory image data 1110 (e.g., a 2-dimensional sampler representing one or more frames of image data or a portion thereof) from the display memory 1108 and transforms the display memory data 1110 into a format suitable to be processed by a CPU 1132. For instance, the encoding module 1112 may set the size of the image data to be the same as the camera resolution (e.g., 1920×1080). The output of the encoding module 1112, pixel units (e.g., pixel bytes) of image data, can may be provided to the main memory 1118 and used by the CPU 1132. The CPU 1132 may be a general-purpose CPU configured to execute different applications and the main memory 1118 may be shared among different applications.

Depending on the settings of the image sensor and other configurations (e.g., operating system of the device), the raw image data 1106 provided by the image sensor 1102, the display memory image data 1110 provided by the display memory 1108, and/or the image data 1116 provided by the GPU 1114 may have a specific image size (e.g., number of pixels) and/or a specific format (e.g., a color format or color space). For example, a color format can comprise an ordered set of color channels. Such size and format may be referred to as the source image size (or source size) and source image format (or source color format or source format), respectively.

The source image size and/or source image format may not be the same as required by a target process 1130. Examples of a target process can include a tracking process that is implemented by the tracking unit 708 of FIG. 8. For example, the source image size and the source image format may be 1920×1080 (the same as or different than the default pixel resolution of the image sensor 1102) and red green blue alpha (RGBA), respectively. On the other hand, the target image size (also referred to as target size) and/or the target image format (also referred to as target color format or target format) required by the target process 1130 may be 640×360 and blue green red (BGR), respectively, or whatever is determined for the target process 1130. As such, the image data acquired by the image sensor typically need to be transformed from the source size and/or format to the suitable target size and/or format before the image data can be used by the target process 1130.

The bulk of the data transformation involving resizing and format conversion is typically performed by the general-purpose CPU 1132 in conjunction with the main memory 1118. As illustrated in FIG. 11, the CPU 1132 can implement a resampling module 1122 configured to increase or decrease the size of an image. In an implementation, each pixel of the image (stored in the main memory 1118) is evaluated and for each pixel, its pixel color values are interpolated (e.g., using bilinear interpolation) to obtain a resampled image with the desired image size (e.g., 640× 360). The resampled image data may be stored in the main memory 1118.

The CPU 1132 can also implement a format conversion module 1126 configured to convert the color format (e.g., RGBA) of the resampled image data 1124 to a reformatted image data 1128 with a different color format (e.g., BGR). In an implementation, each pixel of the image (stored in the main memory 1118) is evaluated and for each pixel, at least one color channel (e.g., channel A) is removed and the order of the remaining channels are switched (e.g., from RGB to BGR). The reformatted image data 1128 with the new color format may then be stored in the main memory 1118 and used by the target process 1130.

The approach illustrated in FIG. 11 suffers from several drawbacks. The raw image data must first be encoded and copied from the display memory to the main memory, which can slow down the process. The bulk of the processing to convert the raw image data involves pixel-by-pixel serial operations performed by a general-purpose CPU at a software level, which can be slow compared with a hardware implementation. For instance, both the resampling module 1122 and the format conversion module 1126 are implemented using pixel-by-pixel serial operations, which may be slow compared to parallel operations. Furthermore, sharing of the CPU 1132 and the main memory 1118 among different applications can cause contention for resources and slowdown in performance for some or all of the applications.

FIG. 12 illustrates a second exemplary process 1200 for image processing using existing technologies, in accordance with embodiments. In an example, the process 1200 may be implemented by an Android device. Aspects of the process 1200 are similar to the process 1100 described above, except the source format of the image data is YUVA instead of RGBA. Further, an additional format conversion step is performed (e.g., by the format conversion module 1217 implemented by the CPU 1232) to convert image data from the display memory 1208 to an intermediate format, YUV, and to store the reformatted data in the main memory 1218.

Accordingly, the approach illustrated in FIG. 12 suffers from similar drawbacks as discussed in FIG. 11. In particular, the raw image data must first be encoded and copied from the display memory to the main memory. The bulk of the processing to convert the raw image data involves pixel-by-pixel serial operations performed by a general-purpose CPU. Here, three modules (e.g., format conversion module 1217, resampling module 1222, format conversion module 1226) instead of two (as shown in FIG. 11) are implemented using pixel-by-pixel serial operations.

Figure 13:
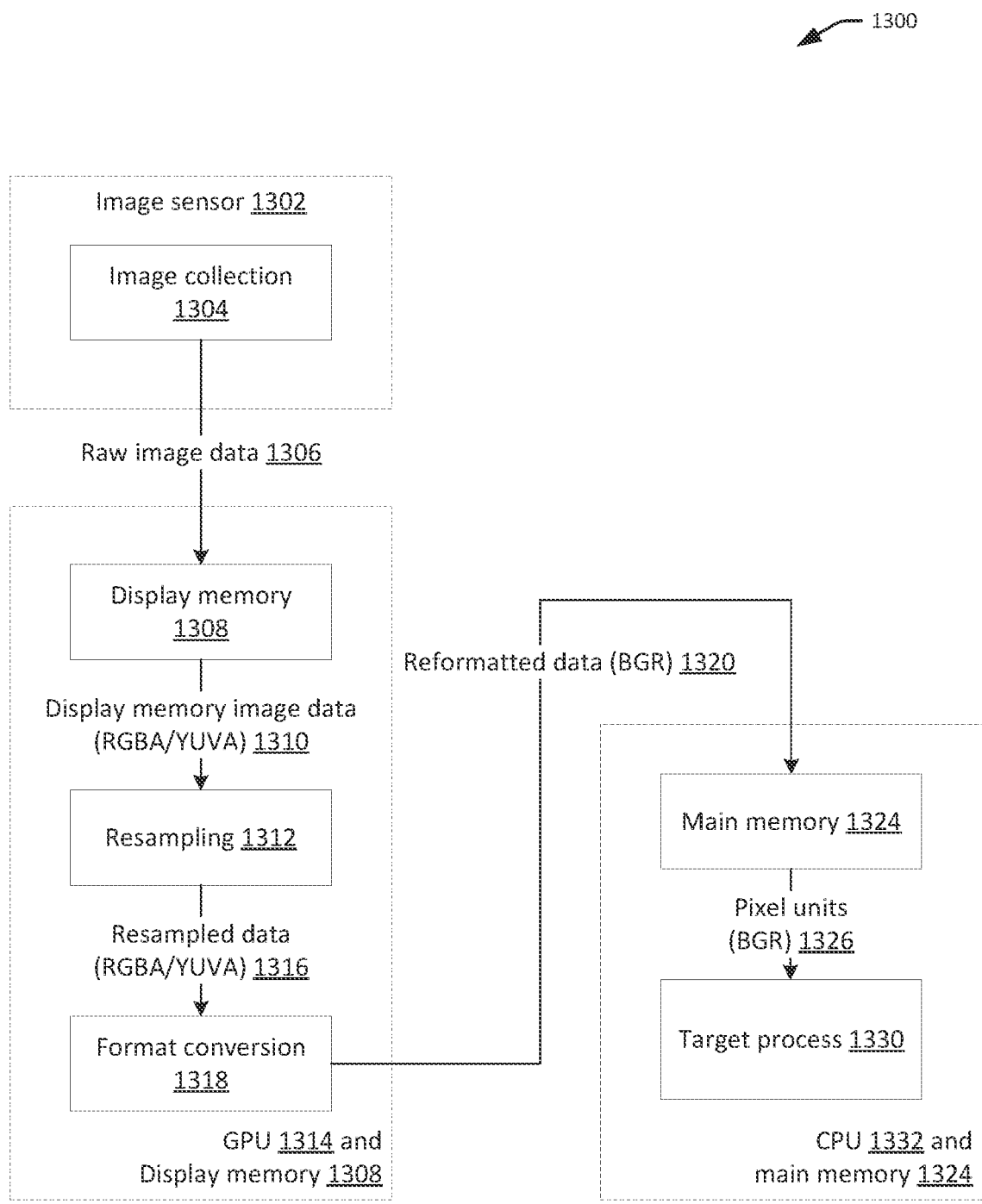
FIG. 13 illustrates exemplary process for image processing, in accordance with embodiments.

FIG. 13 illustrates exemplary process 1300 for image processing that address the drawbacks of existing technologies, in accordance with embodiments. Aspects of the process 1300 can be implemented by a payload discussed herein. In contrast to existing technologies, the bulk of image processing in FIG. 13 is implemented by the GPU using hardware acceleration instead of by a general-purpose CPU, thereby improving performance.

As illustrated, an image collection module 1304 of an image sensor 1302 can capture images and output raw image data 1306 representing the captured images. The raw image data 1306 can be stored in the display memory 1308 dedicated to the GPU 1314. Depending on the type of image sensor 1304 and other configurations (e.g., the operating system of the payload), the raw image data may have different formats or other characteristics. For instance, the raw image data may have a RGBA format or a YUVA format for an iOS device or an Android device, respectively.

Instead of copying the image data to the main memory and resample and reformat the image data in the main memory by a general-purpose CPU, the image data can be transformed more efficiently in the display memory 1308 using a GPU 1314. For instance, a set of image data 1310 to be rendered or processed (e.g., an image frame or a portion thereof) can be retrieved from the display memory 1308 and provided as an input to a resampling module 1312 implemented by the GPU 1314. The resampling module 1312 may be configured to directly resize the image to the target image size (e.g., 640×360) required by the target process 1330. Instead of relying on sequential pixel-by-pixel operations by a general-purpose CPU as discussed in FIGS. 11-12, the GPU 1314 can be programed to run operations concurrently on multiple pixels of the image data. Such operations can include any suitable resampling methods such as interpolation methods (e.g., nearest-neighbor interpolation, bilinear interpolation, bicubic interpolation, Fourier-based interpolation, edge-directed interpolation), vectorization, SFG conversion, and the like.

The resampled data 1316 can be further processed by format conversion module 1318, also implemented by the GPU 1314 in conjunction with the display memory 1308. The format conversion may be configured to change the format (e.g., color format) of the resampled image data 1316 from a source format (e.g., RGBA for an iOS device and YUVA for an Android device) to a target format (e.g., RGB) required by the target process 1330. Depending on the source and target formats, format conversion may include channel transformation and channel removal. Channel transformation can include switching the values of the color channels for each pixel of an image. Thus, channel transformation may change the format of input image data from a source format to an intermediate format. Channel removal can include removing one or more color channels values for a pixel. Channel removal may change the format of input image data from the intermediate format to the source format. In some embodiments, the format of the image data may be changed to more than one intermediate formats before reaching the target format.

Some aspects of the operations discussed above, which would be typically implemented sequentially on a pixel-to-pixel basis by a general-purpose CPU, may be performed concurrently in hardware with GPU programming. In alternatively embodiments, the image data may be format converted before being resampled. When resampling is used for scaling down an image (e.g., reducing the number of pixels), resampling before format conversion may be more efficient than format conversion before resampling, because the amount of data that needs to be reformatted is reduced. The opposite may be true when resampling is used for scaling up the image (e.g., increasing the number of pixels).

In various embodiments, the GPU modules discussed above (e.g., the resampling module 1312 and the format conversion module 1318) may be implemented using any suitable application programming interface (API) or software development kit (SDK) supported by the underlying GPU 1314.

The reformatted image data 1320 having the target format (e.g., BGR) can be provided to the main memory 1324 and used by the target process 1326 implemented by the general-purpose CPU 1332. The target process 1326 can include or be included but not limited to a tracking process discussed herein. For instance, the tracking process can use the resized and reformatted image data to identify a target to be tracked within the image represented by the image data. For instance, the current position, size, and/or other characteristics of the target within the image can be determined. The identification of the target can be based on initial target information, which may be provided via a user interface or from other means. Based on the current target information, the image can be rendered on a display with a visual tracking indicator (e.g., a bounded box) that dynamically indicates the current target information (e.g., current size). The current target information can be used to determine whether there is a deviation from an expected target position and/or size, and whether corrective actions may be required, as discussed in herein. If corrective actions are required, control signals can be generated for causing the corrective actions, such as control signals to change a state of a carrier carrying the payload so as to cause a change in a pose of the payload and hence a change in the field of view of the image sensor of the payload. The control signals can also include instructions for changing parameters of the image sensor (e.g., focal length) to adjust a focus on the target, to zoom in or out from the target, or to cause other changes. It is understood that the tracking process is used as an example of a target process merely for illustrative purposes. In other embodiments, the image processing techniques described herein can be used to transform image data for any other suitable target process.

Figure 14:
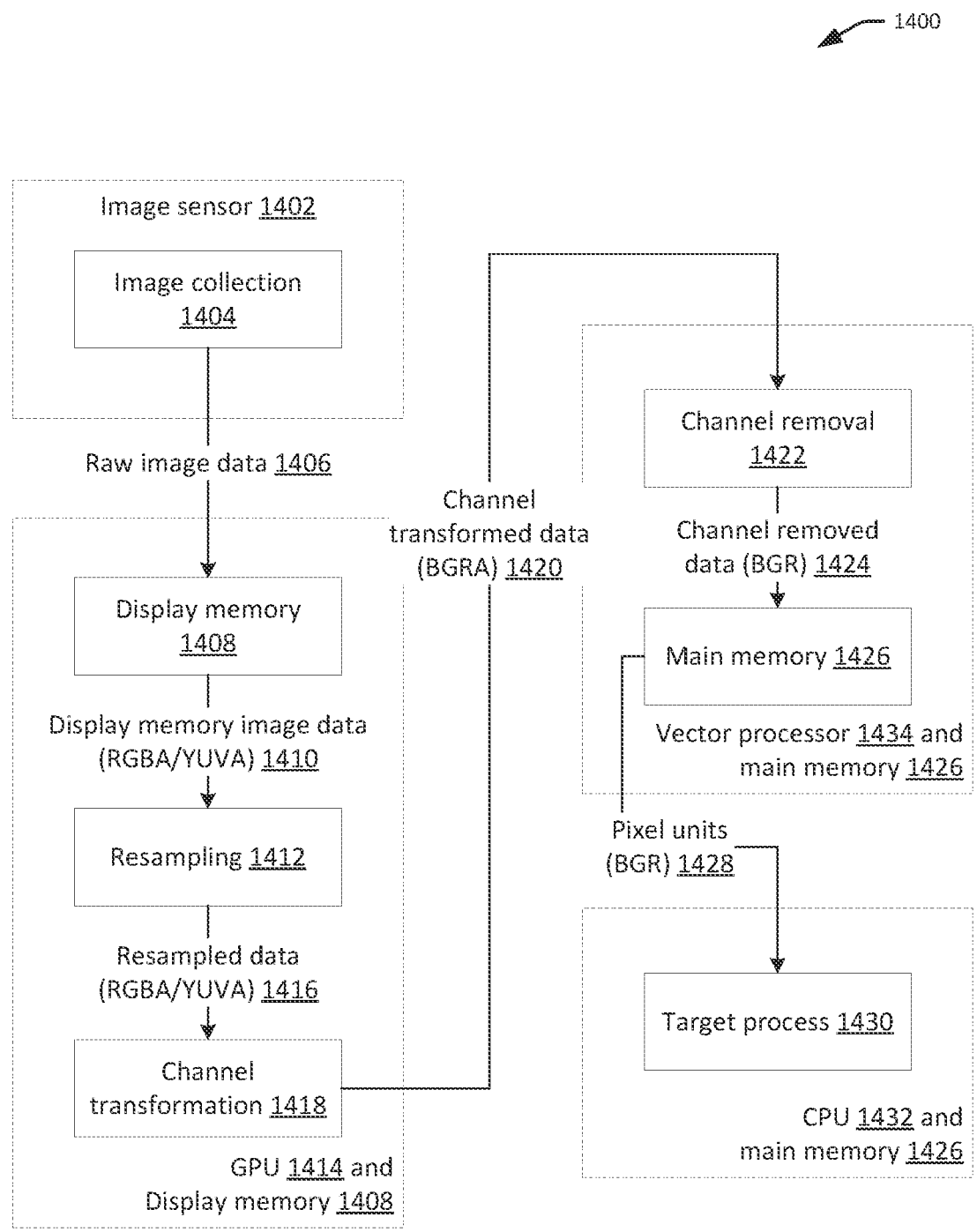
FIG. 14 illustrates another exemplary process for image processing, in accordance with embodiments.

In some embodiments, some or all of the image processing (e.g., resampling, reformatting) can be performed by parallel processing component of a general-purpose CPU to improve performance. A parallel processing component may be capable of performing parallel processing and can include one or more vector processors, such as the vector processors 628 described in FIG. 6. FIG. 14 illustrates another exemplary process 1400 for image processing, where at least some of the processing is performed by a vector processor, in accordance with embodiments. Aspects of the process 1400 may be performed by a payload as described herein. As illustrated, the resampling of the image data can be performed by the GPU 1414 in conjunction with the display memory 1408, in a manner as described above in FIG. 13.

The channel transformation portion of format conversion may be performed by the GPU 1414 in conjunction with the display memory 1408. Thus, channel transformation may change the format of input image data from a source format to one or more intermediate formats or the target format. In an example, the color information for each pixel of the image data is represented by an ordered set of data corresponding to the ordered set of color channels for the color format of the image data. For example, an RGBA encoding for a pixel may include a byte (8 bits) of data for the R channel, followed by a byte of data for the G channel, followed by a byte of data for the B channel, and a byte of data for the A channel. As another example, a YUV encoding of a pixel may include a byte of data for the Y channel, followed by a byte of data for the U channel, followed by a byte of data for the V channel. As another example, a BGR encoding of a pixel may include a byte of data for the B channel, followed by a byte of data for the G channel, followed by a byte of data for the R channel. In various embodiments, the amount of data for encoding each channel may be more or less than one byte in different implementations.

Transforming the channels may include rearranging the order of the channel data and/or changing the data for the channels. For each pixel of the new image data, its color information (e.g., color channel data) can be determined based on the color information of the corresponding pixel in the old image data. Depending on the source format and/or the target format, different channel transformation algorithms may be used. In one example, such as when the operating system of the payload is iOS, the source format is RGBA and the target format is BGR. In this example, channel transformation is performed for each pixel using the following transformation matrix:

$$\begin{bmatrix} B \\ G \\ R \\ W \end{bmatrix} = \begin{bmatrix} 0 & 0 & 1 & 0 \\ 0 & 1 & 0 & 0 \\ 1 & 0 & 0 & 0 \\ 0 & 0 & 0 & 0 \end{bmatrix} \begin{bmatrix} R \\ G \\ B \\ A \end{bmatrix}$$

Here, the new color encoding for each pixel is B channel data (obtained from the B channel of the previous color information), followed by G channel data (obtained from the previous G channel), followed by R channel data (obtained from the previous R channel), and followed W channel data (zero). The BGRW is an intermediate format and the extra channel W is to be removed by the channel removal process described below.

In another example, such as when the operating system of the payload is Android, the source format is YUV and the target format is BGR. In this example, channel transformation includes not only channel reordering, but also data transformation. Specifically, the channel transformation for each pixels is performed using the following transformation matrix:

$$\begin{bmatrix} B \\ G \\ R \\ W \end{bmatrix} = \begin{bmatrix} +1.000000 & +1.177200 & +0.000000 & +0.000000 \\ +1.000000 & -0.344140 & -0.714140 & +0.000000 \\ +1.000000 & +0.000000 & +1.402000 & +0.000000 \\ +0.000000 & +0.000000 & +0.000000 & +0.000000 \end{bmatrix} \begin{bmatrix} Y \\ U \\ V \\ W \end{bmatrix}$$

Here, the channel W may be added to both the source and intermediate formats as a dummy channel because the GPU only supports four-channel operations. The channel W will be removed by the channel removal process described below.

The channel transformed data (e.g., in an intermediate format such as BGRW) may be stored in the display memory 1408 and made accessible to an external processor such as a vector processor 1434. The vector processor 1434 may implement a channel removal module 1422, which takes the channel transformed data (e.g., in BGRW format) as input, removes the extra color channel (e.g., the W channel) for each pixel, and store the channel removed data (e.g., in BGR format) to the main memory 1426 for use by the target process 1430 (e.g., tracking process). The channel removal module 1422 may be implemented using any suitable API or SDK for the vector processor 1434, such as the vImage framework provided by Apple. In particular, the vector processor 1434 can be programmed to execute concurrent operations on multiple pixels, thereby improving performance over the serial operations by a scalar processor (e.g., the scalar processor 630 of FIG. 6).

Variations of the above embodiments are also within the scope of the disclosure. For example, the optimization techniques described herein can be used to resize images from any suitable source size to any other target size. Likewise, the optimization techniques described herein can be used to convert images from any suitable source format (e.g., having any number and type of color channels) to any other suitable target format (e.g., having any number and type of color channels). Additionally, depending on the source format and the target format and the hardware/software configurations of the GPU and/or CPU, only one of the channel transformation or channel removal steps may be required to convert the data format. For example, in some embodiments, only channel transformation may be required if the source format is RGBA and the target format is BGRA. Only channel removal may be required if the source format is RGBA and the target format is RGB. In some embodiments, the order of channel transformation and channel removal may be reversed so that channel removal is performed before channel transformation. In some embodiments, format conversion may require channel addition instead of or in addition to channel removal. Any or any combination of the channel transformation, channel removal, and channel addition steps may be performed by the GPU or a parallel processing component of the CPU (e.g., one or more vector processors) to enhance performance.

Compared with the conventional techniques described in FIGS. 11-12, the techniques described herein provide several advantages. Because the image sensor typically stores raw image data directly to the display memory, it is more efficient to use the GPU in conjunction with the display memory and perform the majority of the image processing steps (e.g., resampling and reformatting). The GPU can directly access the display memory and operate on the image data stored in the display memory, saving the cost associated with data storage operations such as allocating storage space in the main memory, storing data to the allocated space, and reclaiming the space. Additionally, the GPU, with concurrency support for image processing at the hardware level, can accelerate the image processing operations typically performed serially at the software level by the CPU. The use of the parallel processing component of the CPU also improves performance by introducing more concurrency into the image processing operations. Furthermore, the described techniques allow the CPU to dedicate more resources to handle other processes, thereby increasing the response time for these processes, which may translate to better user experience. For example, a user may experience better responsiveness at a user interface provided by an application that now receives more CPU time.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method, comprising:
receiving, by a user interface of a payload, user selection of a target within an image displayed on the user interface, the image being captured by an image sensor of the payload;
detecting, by one or more processors of the payload, a deviation of the target from an expected target state within the image, the payload being coupled to a carrier;
generating, by the one or more processors, one or more payload control signals based at least in part on the detected deviation of the target, the one or more payload control signals including a first angular velocity configured to rotate the payload with respect to an axis of the carrier to reduce the detected deviation with respect to the axis in a subsequent image captured by the image sensor;
generating, by a base support, one or more base support control signals including a second angular velocity configured to rotate the payload with respect to the axis of the carrier, the base support being coupled to the carrier; and
in response to receiving the first angular velocity and the second angular velocity, controlling the carrier to rotate the payload at a third angular velocity with respect to the axis of the carrier, the third angular velocity being one of the first angular velocity, the second angular velocity, or a combination of the first angular velocity and the second angular velocity.

2. The method of claim 1, wherein the combination of the first angular velocity and the second angular velocity is one of an average, a maximum, or a minimum of the first angular velocity and the second angular velocity.

3. The method of claim 1, further comprising:
determining, by the one or more processors, whether the payload is in a tracking mode; and
in response to determining that the payload is in the tracking mode, filtering out the second angular velocity for controlling the carrier to rotate the payload at the first angular velocity to track the target.

4. The method of claim 1, wherein the carrier is magnetically coupled to a side of the payload for quick release.

5. The method of claim 1, wherein the axis is one of at least three rotation axes of the carrier, and the at least three rotation axes of the carrier are orthogonal or non-orthogonal to each other.

6. The method of claim 1, wherein the expected target state is received from the user interface provided by the payload, and the expected target state includes an expected target position and an expected target size within the image.

7. The method of claim 1, further comprising:
identifying, by the one or more processors of the payload, the target within the image based at least in part on initial target information received from the user interface provided by the payload.

8. The method of claim 7, wherein the initial target information includes a position, size, color, texture, pattern, shape, dimension, or characteristics of the target.

9. The method of claim 7, wherein the expected target state includes an expected target position and an expected target size within the image, identifying the target includes determining a current position of the target within the image, and detecting the deviation is based on detecting a deviation distance between the expected target position and the current position of the target within the image.

10. The method of claim 9, further comprising:
adjusting one or more parameters of the image sensor based at least in part on the expected target state, wherein the one or more parameters include at least one of a focal length, zoom level, image mode, image resolution, depth of field, exposure, lens speed, or field of view.

11. The method of claim 1, wherein the payload is a mobile phone and the user interface includes a touchscreen.

12. The method of claim 1, wherein the base support is a handheld support, and the one or more base support control signals are received via an input component provided by the handheld support.

13. The method of claim 12, wherein the input component provided by the handheld support includes at least one of a button, lever, joystick, touchscreen, microphone, or camera.

14. The method of claim 12, wherein the handheld support further comprises an output component, and the output component includes at least one of a display or a speaker.

15. The method of claim 1, wherein the carrier includes one or more rotation assemblies configured to accommodate the payload in various dimensions or reposition a center of gravity of at least a portion of the payload to a rotation axis of the rotation assemblies in an automation process.

16. A carrier configured to support a payload, comprising:
one or more actuators configured to allow rotation of the payload relative to the carrier;
a communication unit configured to receive one or more payload control signals from the payload, the one or more payload control signals being generated by the payload in response to:
(1) receiving user selection of a target within an image displayed on a user interface of the payload that is captured by the payload; and
(2) detecting a deviation of the target from an expected target state within the image;
wherein the one or more payload control signals include a first angular velocity configured to rotate the payload with respect to an axis of the carrier to reduce the detected deviation with respect to the axis in a subsequent image captured by the payload; and
a carrier controller communicatively coupled to the communication unit and the one or more actuators, the carrier controller being configured to control the one or more actuators to change a pose of the payload based at least in part on the one or more payload control signals and one or more base support control signals generated by a base support coupled to the carrier, the one or more base support control signals including a second angular velocity configured to rotate the payload with respect to the axis of the carrier;
wherein in response to receiving the first angular velocity and the second angular velocity, the carrier controller controls the carrier to rotate the payload at a third angular velocity with respect to the axis of the carrier, the third angular velocity being one of the first angular velocity, the second angular velocity, or a combination of the first angular velocity and the second angular velocity.

17. The carrier of claim 16, wherein the combination of the first angular velocity and the second angular velocity is one of an average, a maximum, or a minimum of the first angular velocity and the second angular velocity.

18. The carrier of claim 16, wherein the carrier controller is further configured to:
determine whether the payload is in a tracking mode; and
in response to determining that the payload is in the tracking mode, filter out the second angular velocity for controlling the carrier to rotate the payload at the first angular velocity to track the target.

19. The carrier of claim 16, wherein the carrier is magnetically coupled to a side of the payload for quick release.

20. One or more non-transitory computer-readable storage media storing computer executable instructions that, when executed by a computing system of a payload, configure the computing system to perform operations comprising:
receiving, by a user interface of a payload, user selection of a target within an image displayed on the user interface, the image being captured by an image sensor of the payload;
detecting, by one or more processors of the payload, a deviation of the target from an expected target state within the image, the payload being coupled to a carrier;
generating, by the one or more processors, one or more payload control signals based at least in part on the detected deviation of the target, the one or more payload control signals including a first angular velocity configured to rotate the payload with respect to an axis of the carrier to reduce the detected deviation with respect to the axis in a subsequent image captured by the image sensor;
generating, by a base support, one or more base support control signals including a second angular velocity configured to rotate the payload with respect to the axis of the carrier, the base support being coupled to the carrier; and
in response to receiving the first angular velocity and the second angular velocity, controlling the carrier to rotate the payload at a third angular velocity with respect to the axis of the carrier, the third angular velocity being one of the first angular velocity, the second angular velocity, or a combination of the first angular velocity and the second angular velocity.

* * * * *